United States Patent
Yabuuchi

(10) Patent No.: US 8,780,058 B2
(45) Date of Patent: Jul. 15, 2014

(54) INFORMATION INPUT DEVICE, IMAGE FORMING DEVICE, INPUT CONTROL METHOD, AND COMPUTER-READABLE RECORDING MEDIUM

(75) Inventor: Masayuki Yabuuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 12/765,934

(22) Filed: Apr. 23, 2010

(65) Prior Publication Data

US 2010/0283751 A1 Nov. 11, 2010

(30) Foreign Application Priority Data

May 11, 2009 (JP) .................................. 2009-114813
Mar. 9, 2010 (JP) .................................. 2010-052383

(51) Int. Cl.
*G06F 3/041* (2006.01)
*G06F 3/044* (2006.01)
(52) U.S. Cl.
CPC .............. *G06F 3/044* (2013.01); *G06F 3/0416* (2013.01)
USPC .......................................... 345/173; 345/174
(58) Field of Classification Search
CPC ....... G06F 3/041; G06F 3/0412; G06F 3/044; G06F 3/045; G06F 3/047
USPC ................................................ 345/173–179
See application file for complete search history.

(56) References Cited

U.S. PATENT DOCUMENTS

| | | | | |
|---|---|---|---|---|
| 5,650,597 A | * | 7/1997 | Redmayne | .................. 178/18.06 |
| 8,031,180 B2 | * | 10/2011 | Miyamoto et al. | ............. 345/173 |
| 8,508,491 B2 | * | 8/2013 | Yabuuchi et al. | ............. 345/173 |
| 2004/0144926 A1 | * | 7/2004 | Arques et al. | ............. 250/370.01 |
| 2006/0262101 A1 | * | 11/2006 | Layton et al. | .................. 345/173 |
| 2008/0048997 A1 | * | 2/2008 | Gillespie et al. | ............... 345/174 |
| 2008/0158167 A1 | * | 7/2008 | Hotelling et al. | .............. 345/173 |
| 2008/0246740 A1 | * | 10/2008 | Nakamura et al. | ............. 345/173 |

(Continued)

FOREIGN PATENT DOCUMENTS

| | | |
|---|---|---|
| JP | 07-110741 | 4/1995 |
| JP | H11-161425 | 6/1999 |
| JP | 2002-182835 | 6/2002 |
| JP | 2003-263274 | 9/2003 |

OTHER PUBLICATIONS

Japanese Office Action dated Aug. 20, 2013.

*Primary Examiner* — Vijay Shankar
*Assistant Examiner* — Nelson Lam
(74) *Attorney, Agent, or Firm* — IPUSA, PLLC

(57) ABSTRACT

An information input device includes a plurality of sensors arranged for an operation surface at predetermined intervals, each sensor detecting contact of an operation object with the operation surface in a vicinity of the sensor and outputting a detection signal. An input sensing judgment unit determines whether an input of the operation object is sensed based on an integrated detection signal of the plurality of sensors. A sensor group selection unit selects a sensor group including sensors having sensed the operation object from among the plurality of sensors based on detection signals of the sensors. A sensor specifying unit specifies the sensors having sensed the operation object from the selected sensor group based on the detection signals of the sensors. A position detecting unit detects a position of the operation object on the operation surface based on the detection signals of the specified sensors.

16 Claims, 13 Drawing Sheets

(56) References Cited

U.S. PATENT DOCUMENTS

| | | | |
|---|---|---|---|
| 2009/0009486 A1* | 1/2009 | Sato et al. | 345/174 |
| 2009/0050376 A1* | 2/2009 | Jeon et al. | 178/18.03 |
| 2009/0102813 A1* | 4/2009 | Mamba et al. | 345/174 |
| 2009/0273579 A1* | 11/2009 | Zachut et al. | 345/174 |
| 2010/0033748 A1 | 2/2010 | Enami et al. | |
| 2010/0053094 A1* | 3/2010 | Kong et al. | 345/173 |
| 2010/0073301 A1* | 3/2010 | Yousefpor et al. | 345/173 |
| 2010/0295813 A1* | 11/2010 | Kent | 345/174 |

* cited by examiner

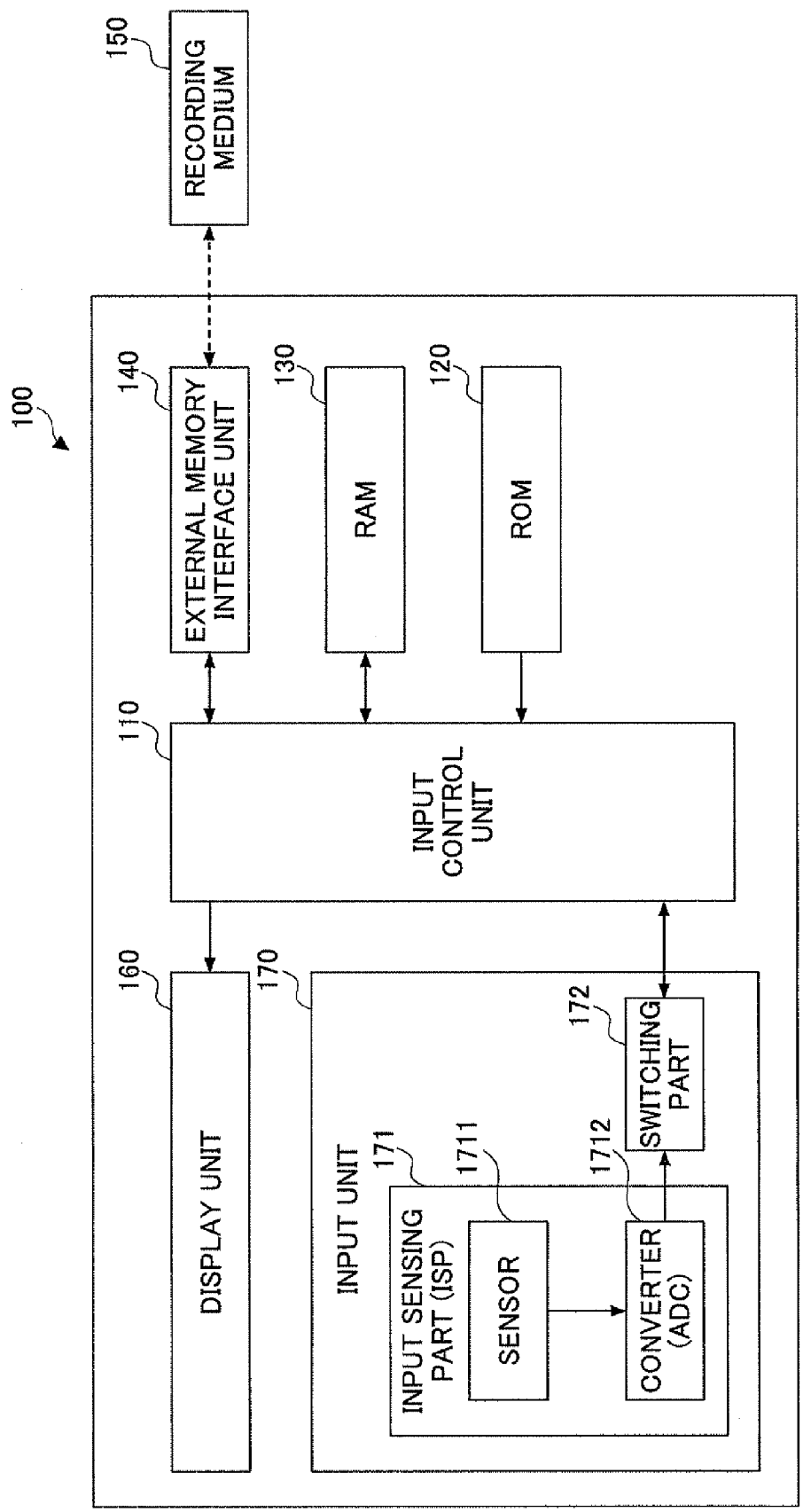

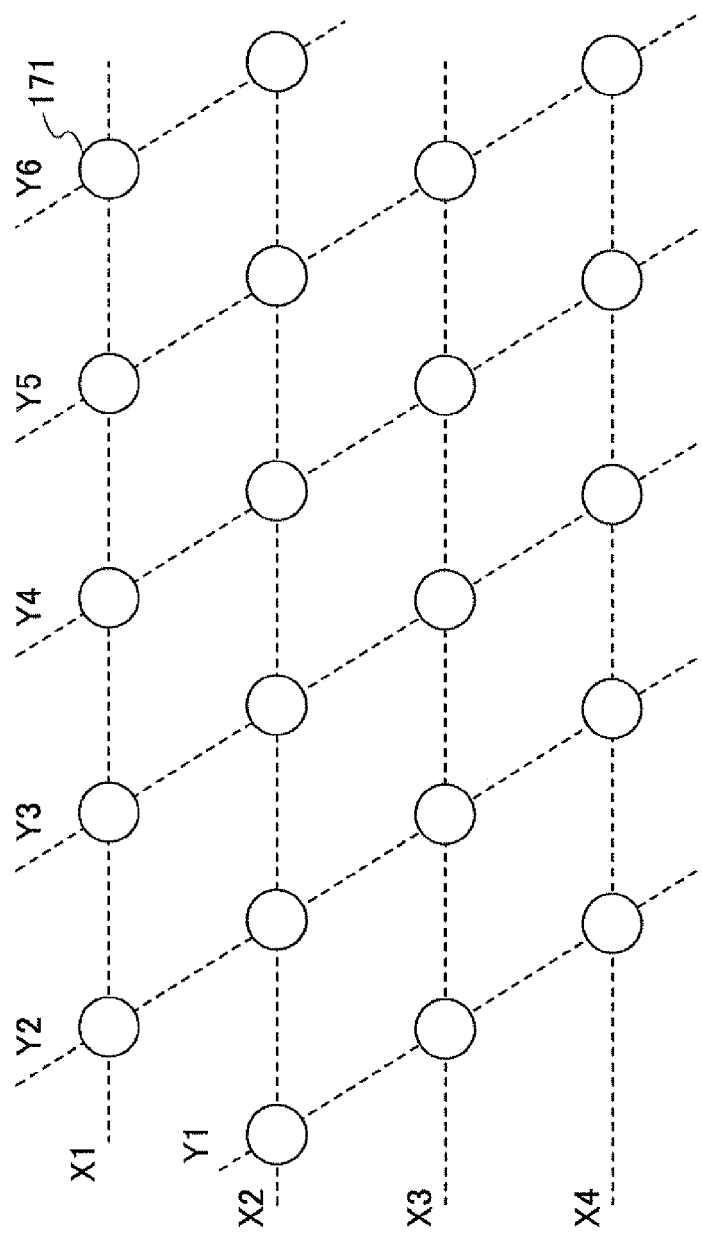

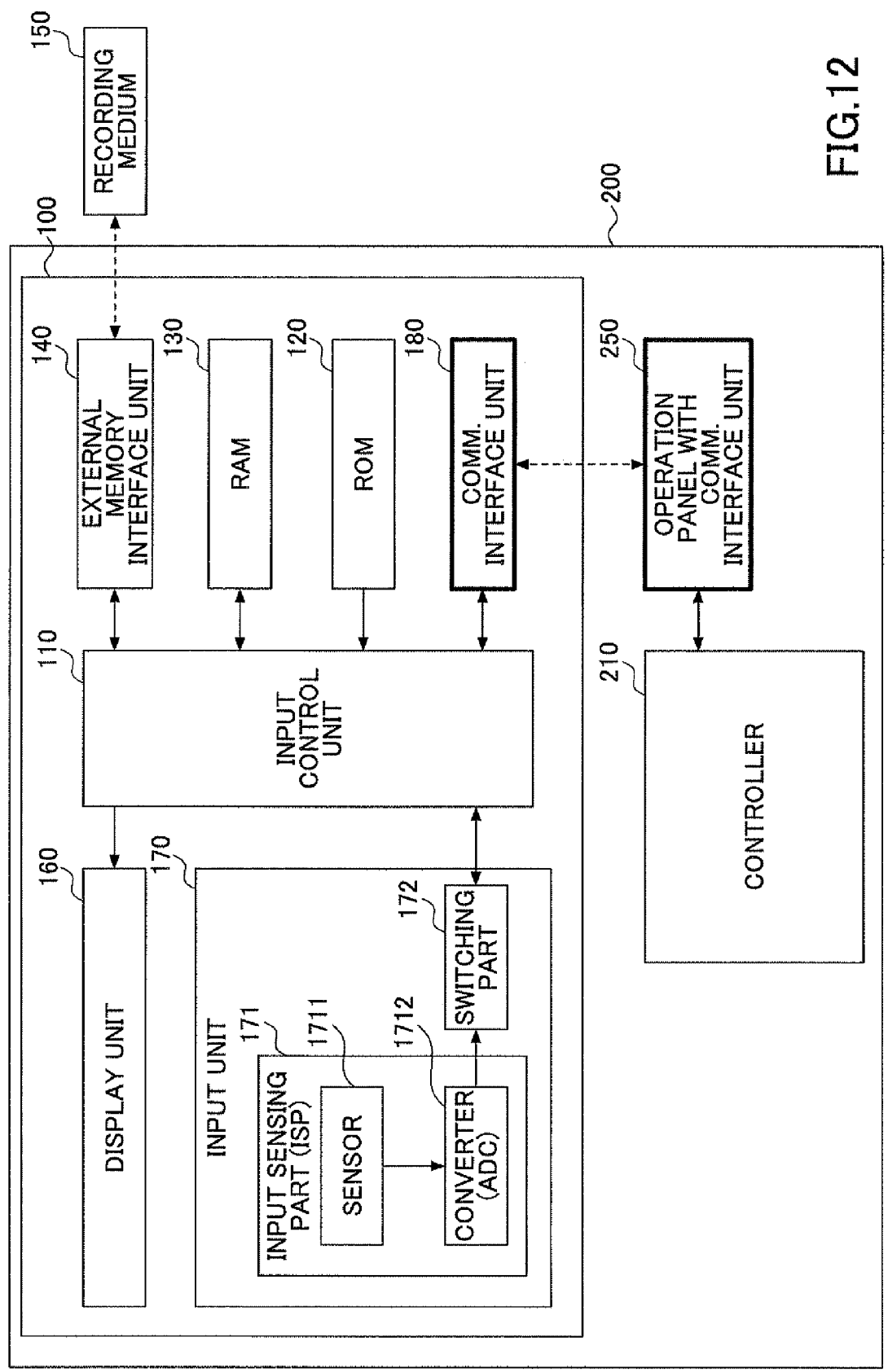

INFORMATION INPUT DEVICE, IMAGE FORMING DEVICE, INPUT CONTROL METHOD, AND COMPUTER-READABLE RECORDING MEDIUM

BACKGROUND OF THE INVENTION

1. Field of the Invention

This invention relates to an information input device, an image forming device, an input control method, and a computer-readable recording medium. In particular, this invention relates to a device and a method for controlling an information signal input by a user operation on a display screen of an information input device.

2. Description of the Related Art

In recent years, an image forming device of multiple function type, such as an MFP (multi-functional peripheral), is provided with an operation panel which is usable to input various kinds of information corresponding to its multiple image forming functions. This enables a user to input characters or select a desired one of the multiple functions.

The operation panel in the above-described image forming device includes an input unit (a switching part) which incorporates the tact key system. An operation panel of another type may be a switch panel which is provided with a display screen in which a plurality of contact keys are arranged in a lattice formation. See Japanese Laid-Open Patent Publication No. 2002-182835, for example.

However, there is a problem in that the information input device according to the related art, such as the above-mentioned operation panel, requires a complicated configuration or device layout.

The information input device according to the related art has a configuration in which a pair of the operation keys to be depressed (or touched) at a time of input operation and the sensors to detect the input operation are arranged. As the number of the functions provided in the device increases, the number of the sensors provided in the device has to increase. The signal lines from these sensors are wired to a control unit (for example, a CPU) to transmit detection signals from the sensors to the control unit.

For example, the control unit is arranged so that the operated position on the display screen is detected based on the detection signals from the sensors, and a request of the input operation is determined from the detected position. Therefore, as the number of the sensors provided in the device increases, the number of the signal lines arranged in the device has to increase.

Accordingly, if the information input device according to the related art is adapted for a multi-functional image forming device, the configuration to perform the input control has to be complicated, which results in an increase in the manufacture cost.

SUMMARY OF THE INVENTION

In one aspect of the invention, the present disclosure provides an information input device, an image forming device, an input control method, and a computer-readable recording medium which are able to reduce the signal lines connected between the sensors and the control unit and perform the input control.

In an embodiment of the invention which solves or reduces one or more of the above-mentioned problems, the present disclosure provides an information input device including: a plurality of sensors arranged for an operation surface at predetermined intervals, each sensor detecting contact of an operation object with the operation surface in a vicinity of the sensor and outputting a detection signal according to a distance between the sensor and the operation object; an input sensing judgment unit to determine whether an input of the operation object is sensed based on an integrated detection signal of a plurality of detection signals output from the plurality of sensors; a sensor group selection unit to select a sensor group including sensors having sensed the operation object, from among the plurality of sensors arranged for the operation surface, based on detection signals of the sensors having sensed the operation object; a sensor specifying unit to specify the sensors having sensed the operation object from the selected sensor group based on the detection signals of the sensors having sensed the operation object; and a position detecting unit to detect a position of the operation object on the operation surface based on the detection signals of the sensors specified by the sensor specifying unit.

In an embodiment of the invention which solves or reduces one or more of the above-mentioned problems, the present disclosure provides an input control method for use in an information input device including a plurality of sensors arranged for an operation surface at predetermined intervals, each sensor detecting contact of an operation object and outputting a detection signal according to a distance between the sensor and the operation object, the input control method including: determining, by an input sensing judgment unit, whether an input of the operation object is sensed based on an integrated detection signal of a plurality of detection signals output from the plurality of sensors; selecting, by a sensor group selection unit, a sensor group including sensors having sensed the operation object, from among the plurality of sensors arranged for the operation surface, based on detection signals of the sensors having sensed the operation object; specifying, by a sensor specifying unit, the sensors having sensed the operation object from the selected sensor group based on the detection signals of the sensors having sensed the operation object; and detecting, by a position detecting unit, a position of the operation object on the operation surface based on the detection signals of the sensors specified in the specifying.

Other objects, features and advantages of the invention will become more apparent from the following detailed description when read in conjunction with the accompanying drawings.

BRIEF DESCRIPTION OF THE DRAWINGS

FIG. 1 is a block diagram illustrating the hardware composition of an information input device of an embodiment of the invention.

FIG. 2A and FIG. 2B are diagrams for explaining the arrangement of input sensing parts in the information input device of the present embodiment.

FIG. 12 is a diagram illustrating the hardware composition of the image forming device of the present embodiment which is provided with the information input device.

DETAILED DESCRIPTION OF THE PREFERRED EMBODIMENTS

Figure 2B:
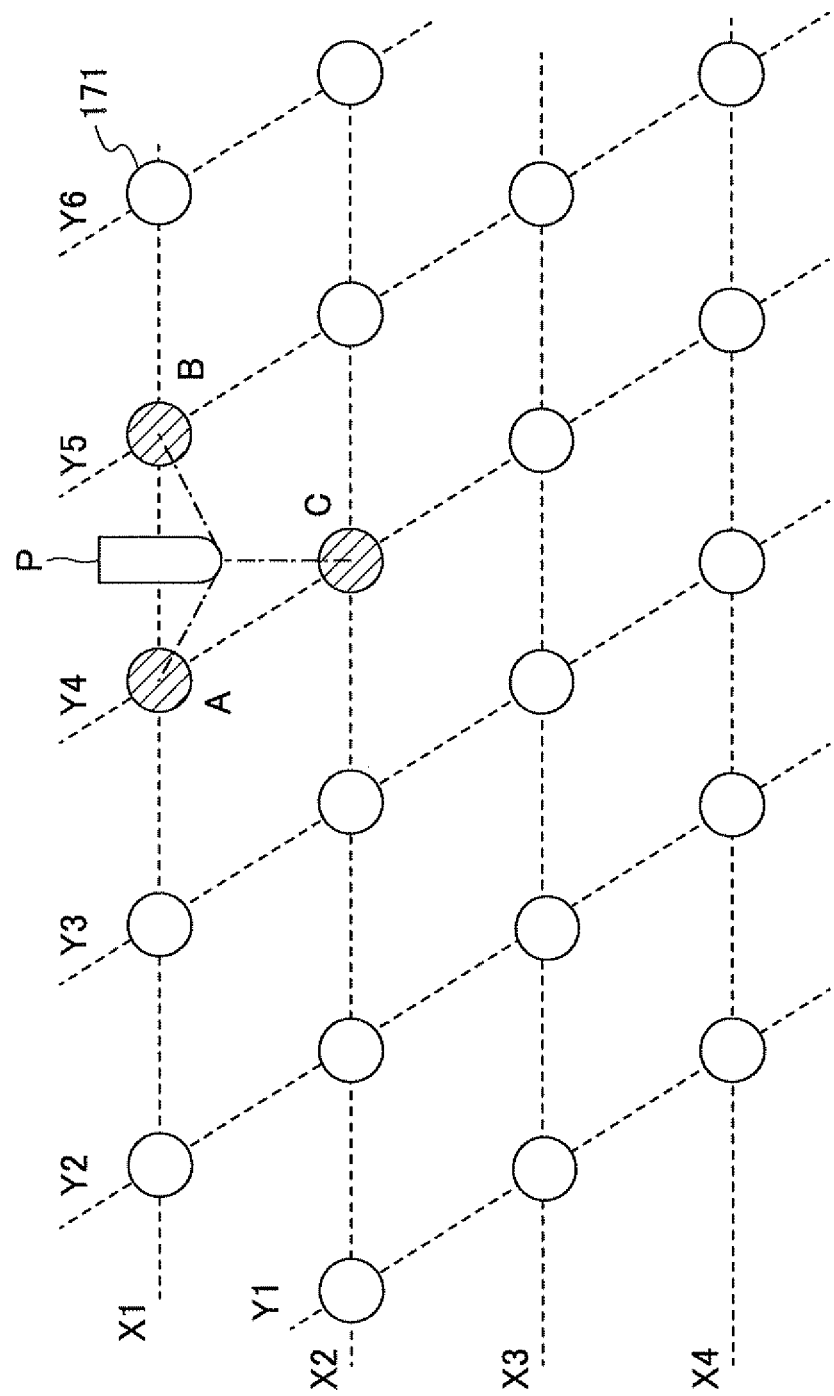

A description will be given of embodiments of the invention with reference to the accompanying drawings.

FIG. 1 is a block diagram illustrating the hardware composition of an information input device 100 of an embodiment of the invention. As illustrated in FIG. 1, the hardware composition of the information input device 100 includes an input control unit 110, a ROM (Read Only Memory) 120, a RAM (Random Access Memory) 130, an external memory interface unit 140, a display unit 160, and an input unit 170. These elements are interconnected by a bus.

The input control unit 110 is a processor, such as a CPU (Central Processing Unit), which carries out control of all the information input devices 100. The ROM 120 is a nonvolatile semiconductor memory (memory device) which retains internal data even when the power is turned off. The RAM 130 is a volatile semiconductor memory (memory device) which temporarily holds programs and data read from the ROM 120. The information input device 100 may be arranged so that the input control unit 110 reads out a stored input control program according to the invention from the ROM 120, loads the program on the RAM 130, and executes the program thereon to carry out the input control procedure (which provides the input control function).

The external memory interface unit 140 is an interface for providing connection of the information input device 100 with a recording medium 150 which is detachably attached to the external memory interface unit 140. The information input device 100 performs reading of data from the recording medium 150 and/or writing of data to the recording medium 150 through the external memory interface unit 140.

The display unit 160 is a display device which displays GUI (Graphical User Interface) indications, such as operation keys, and input data. Examples of the display unit 160 may include a liquid crystal display device, a rewritable seal medium, a color filter, an electronic paper, etc.

The input unit 170 is a detection device which detects an input operation performed on the input unit 170 by a user. For this purpose, the input unit 170 includes a plurality of input sensing parts (ISP) 171 each of which includes a sensor 1711 and a converter 1712. The sensor 1711 is a known sensor for measuring a change of capacitance, and the converter 1712 is an analog/digital converter (ADC) for performing analog/digital (AD) conversion to convert the input analog signal into digital numbers. Each of the input sensing parts 171 inputs the result of measurement (which will be referred to as "detection signal") from the sensor 1711 to the converter 1712, and the converter 1712 converts the detection signal into a digital signal in a form that can be processed by the input control unit 110.

The input unit 170 includes a switching part 172 which switches ON/OFF of the signal lines being used for transmission of the input signals. The switching part 172 performs the switching ON/OFF of the signal lines in response to a control signal received from the input control unit 110. The switching part 172 switches ON/OFF of the signal lines, which are used to transmit the detection signals of the input sensing parts 171 to the input control unit 110, in accordance with the input control procedure.

In the present embodiment, the display unit 160 and the input unit 170 are arranged into an integral part, such as a switch display. Specifically, the display unit 160 is formed on a substrate on which the plurality of input sensing parts 171 are arranged as illustrated in FIG. 2A and FIG. 2B (which substrate will be referred to as the sensor substrate below).

FIG. 2A and FIG. 2B are diagrams for explaining the arrangement of input sensing parts 171 in the information input device of the present embodiment. As illustrated in FIG. 2A, in the sensor substrate of this embodiment, a plurality of input sensing parts (ISP) 171 are arranged in a staggered configuration so that three neighboring ISPs 171 among the plurality of ISPs 171 are located at vertices of an equilateral triangle. This arrangement can be produced by the known patterning and the plurality of input sensing parts 171 on the sensor substrate can be manufactured easily and cheaply.

The plurality of input sensing parts 171 which are arranged in the sensor substrate using the above-described arrangement provides the input permissible area (which will be referred to as "operation surface") for the whole display screen in the display unit 160. Thereby, the information input device 100 can detect an operation (input operation) on the operation surface input by contact of an operation object P which is an electrostatic object, such as a user's finger or a touch pen.

FIG. 2B typically illustrates the way the input operation is detected by the input sensing parts 171. As illustrated in FIG. 2B, if the operation object P contacts the sensor substrate, a result of the detection of the capacitance by the input sensing parts 171 arranged in the neighborhood of the contact position changes, and the input operation by the user on the operation surface can be detected by the change of the detection result. In the example of FIG. 2B, it is assumed that the input sensing parts A, B, and C among the plurality of input sensing parts 171 have detected the change of capacitance.

Each of the plurality of input sensing parts 171 continuously measures a value of capacitance, the ON/OFF state of each of the plurality of input sensing parts 171 is switched, and the measured value of capacitance from each of the plurality of input sensing parts 171 is acquired. The acquired measurement value is input to the input control unit 110 through the corresponding one of the signal transmission lines which is switched to the ON state by the switching part 172, so that the position of the operation object P on the operation surface is detected.

In this manner, in the information input device 100, contact of the operation object P with the operation surface in the neighborhood is detected by the neighboring input sensing parts 171, and a detection signal indicating a measured capacitance change (which is a measured change of capacitance depending on to the distance between the ISP and the operation object P) is transmitted to the input control unit 110, so that the input control unit 110 can detect the position of the operation object P on the operation surface based on the received detection signal.

Next, the input control function of the information input device of this embodiment will be described.

In the information input device 100 of this embodiment, if contact of the operation object P with the operation surface is detected by the neighboring sensors 1711, a specific sensor group including the neighboring sensors 1711 that have detected the contact of the operation object P is selected from among the plurality of sensors 1711, based on the integrated detection signal. Subsequently, the information input device 100 specifies the sensors 1711 that have detected the contact of the operation object P from the selected sensor group, based on the detection signals of the sensors 1711 contained in the selected sensor group. As a result, the information input device 100 detects the position of the operation object P based on the detection signals of the specified sensors 1711. The information input device 100 of this embodiment has the input control function described above.

As illustrated in FIG. 2A and FIG. 2B, in the information input device 100 of this embodiment, the position of the operation object P is detectable based on the detection signal by a predetermined number of input sensing parts 171 (in the case of the illustrated example, three sensors).

Figure 3:
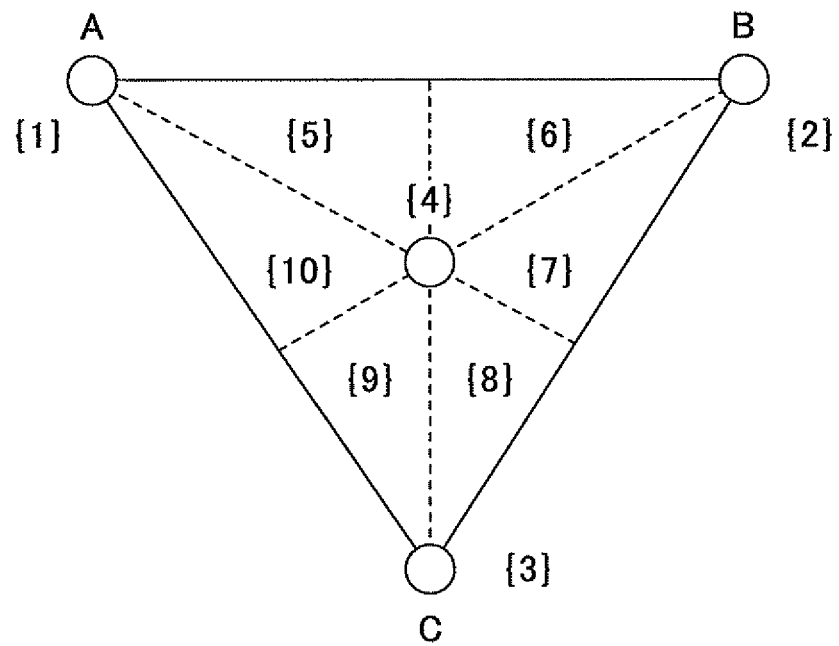
FIG. 3 is a diagram illustrating an example of the position of an operation object detectable by the input sensing parts in the present embodiment.

FIG. 3 illustrates an example of the position of an operation object detectable by the input sensing parts 171 in the information input device 100 of this embodiment. As illustrated in FIG. 3, in the information input device 100 of this embodiment, the position of the operation object P detectable by the input sensing parts A, B, and C covers ten different surface areas. Specifically, the surface areas that are detectable by the input sensing parts A, B, and C as the position of the operation object are as follows. First, in the information input device 100, the positions 1, 2, and 3 (or the surface areas {1}, {2}, and {3}) which are the same as the arranged positions of the input sensing parts A, B, and C, respectively, are detectable as the position of the operation object P. Furthermore, in the information input device 100, the position 4 (or the surface area {4}) which is located at the equal distance away from the input sensing parts A, B, and C is detectable as the position of the operation object P. Furthermore, in the information input device 100, the positions 5 and 10 (or the surface areas {5} and {10}) which are adjacent to the side of the position of the input sensing part A, the positions 6 and 7 (or the surface areas 6 and 7) which are adjacent to the side of the position of the input sensing part B, and the positions 8 and 9 (or the surface areas {8} and {9}) which are adjacent to the side of the input sensing part C are detectable as the position of the operation object P.

The reason the above-described ten surface areas are detectable as the position of the operation object P by the three input sensing parts is that the position of the operation object P on the operation surface is determined based on a plurality of measured capacitance changes acquired from the three input sensing parts 171. For example, in the case of the position 1, the changes of capacitance measured by the input sensing parts B and C are the same, and the change of capacitance measured by the input sensing part A is larger than the change of capacitance measured by each of the input sensing parts B and C. In the case of the position 4, the changes of capacitance measured by the input sensing part A, B, and C are the same.

In this manner, in the information input device 100 of this embodiment, one of the plurality of previously assigned surface areas can be determined based on the plurality of measured capacitance changes acquired from the input sensing parts 171. Therefore, it is not necessary for the information input device 100 to have a one-to-one correspondence between the operation keys assigned to the surface areas of the operation surface and the sensors 1711, and it is possible to reduce the number of sensors needed for the information input device 100 of this embodiment from that for the information input device according to the related art.

However, the plurality of input sensing parts 171 have to be arranged to provide the operation surface for the whole display screen in the display unit 160. Even if the number of the sensors (the input sensing parts 171) can be reduced, a corresponding number of signal lines for the number of input sensing parts 171 must be wired between the input sensing parts 171 and the input control unit 110. For this reason, adaptation of the information input device to a multi-functional image forming device would result in a complicated composition to perform the input control and an increase in the manufacture cost.

To eliminate the problem, in the information input device 100 of this embodiment, the detection signals from a predetermined number of input sensing parts 171 are integrated into a single detection signal, the ON/OFF of each of the signal transmission lines to the input control unit 110 is switched, and the input sensing parts 171 that have detected the operation object P are specified step by step based on the integrated detection signal. In this embodiment, rather than using the detection signals from all of the input sensing parts 171 provided in the information input device 100, the information input device 100 of this embodiment is arranged to limit the whole input-permissible area (the operation surface) to a narrow area (operation area) where the operation object P actually contacts the operation surface, and detect the position of the operation object P based on the detection signals from the input sensing parts 171 which are specified from among the input sensing parts 171 in the narrow operation area. Thereby, the information input device 100 of this embodiment can detect the position of the operation object P with a small number of sensors, and can reduce the number of signal lines connected between the input sensing parts 171 and the input control unit 110.

In the following, the detailed composition and operation of the above-described input control function will be described.

Figure 4:
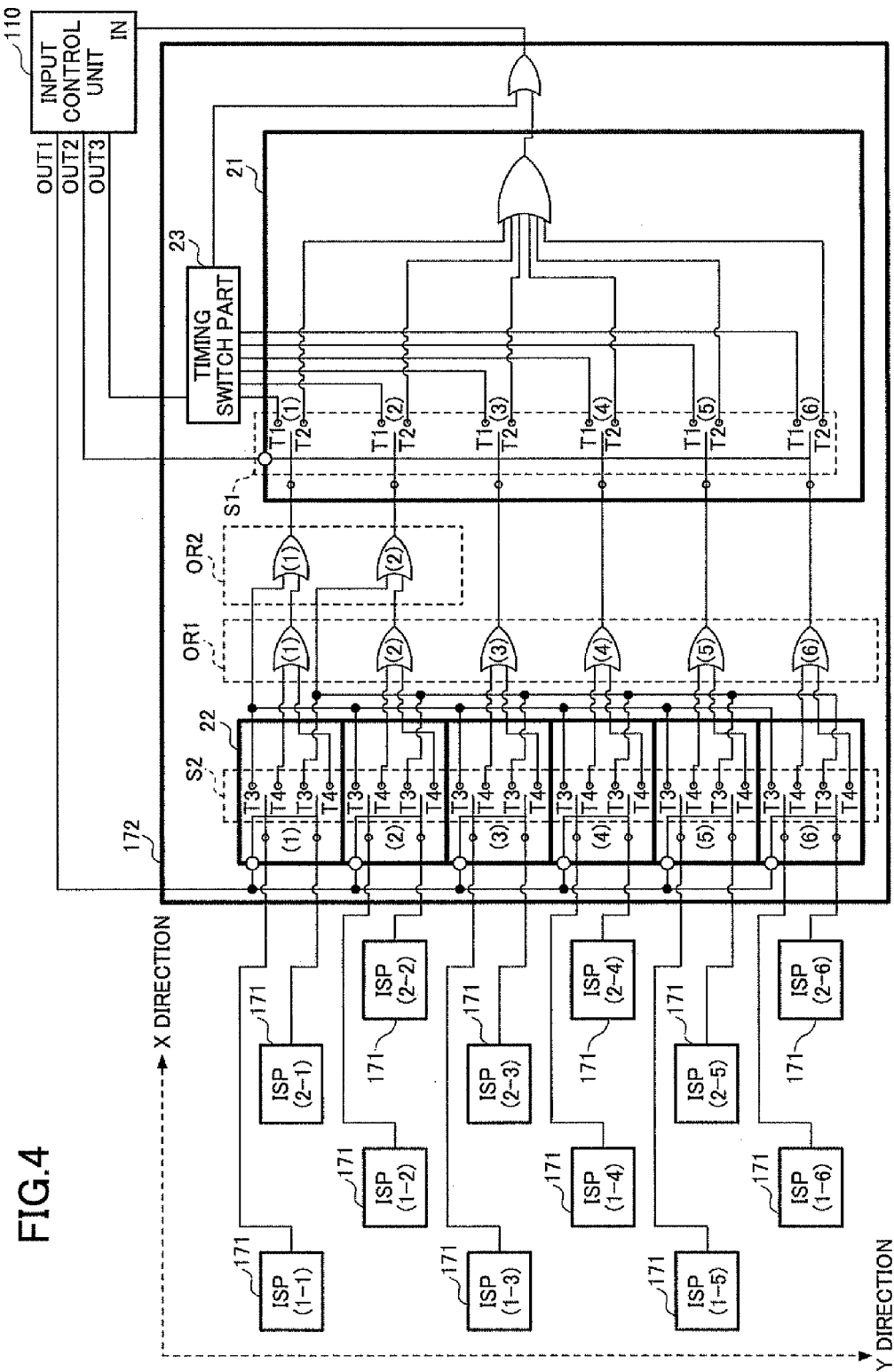
FIG. 4 is a diagram illustrating the circuit composition of an input unit in the information input device of the present embodiment.

FIG. 4 is a diagram illustrating the circuit composition of the input unit 170 in the information input device 100 of this embodiment. For the sake of better understanding of the switching of the signal transmission lines by the switching part 172, in FIG. 4, a two-dimensional coordinate space (X-Y) is illustrated in FIG. 4 to show an exemplary arrangement of input sensing parts 171 in the input unit 170. In the example of the input unit 170 of FIG. 4, a total of 12 input sensing parts (ISP) 171 in which two columns of input sensing parts 171 are arrayed in the direction of X and six rows of input sensing parts 171 are arrayed in the direction of Y are illustrated.

As illustrated in FIG. 4, in the input unit 170 of this embodiment, the signal lines are wired from the plurality of input sensing parts (ISP) 171 (which are arranged at predetermined intervals in a staggered configuration for the operation surface facing the display screen of the display unit 160) to the switching part 172, and the signal lines are further wired from the switching part 172 to the input control unit 110. Namely, the detection signals from the respective input sensing parts 171 are transmitted to the input control unit 110 through the switching part 172.

The switching part 172 includes a Y-direction switch part 21, an X-direction switch part 22, and a timing switch part 23.

The Y-direction switch part 21 is a switching circuit which switches ON/OFF of the signal transmission lines, including the signal lines to transmit the detection signals from the input sensing parts 172 (arrayed in the direction of Y) to subsequent-stage OR circuits and the signal lines to transmit the detection signals to the timing switch part 23. For this purpose, the Y-direction switch part 21 includes a plurality of switches S1 (1)-(6) for switching ON/OFF of the above-mentioned signal transmission lines. Each switch S1 is controlled in accordance with a control signal from the input control unit 110 (which signal is an output signal from a terminal OUT2 of the input control unit 110). In the OR circuits and the timing switch part 23 to which the detection signals are supplied after ON/OFF of the above-mentioned signal transmission lines is switched, a corresponding number of signal lines for the number of input sensing parts 171 arrayed in the direction of Y are wired (in the case of FIG. 4, six signal lines are wired).

For example, in the information input device 100 of this embodiment, if the switches S1 of the Y-direction switch part 21 are respectively turned to the terminals T2 connected to the signal transmission lines, the number of detection signals are transmitted to the OR circuit. As a result, an integrated detection signal is supplied from the OR circuit to the input control unit 110. Specifically, in the case of FIG. 4, an integrated detection signal of the detection signals supplied to the switches S1 (1)-(6) of the Y-direction switch part 21 is supplied to the input control unit 110. Namely, the OR of the number of detection signals from the input sensing parts 171 arrayed in the direction of Y is performed and the resulting signal (integrated detection signal) is supplied from the OR circuit to the terminal IN of the input control unit 110. The signal transmission lines may be used when determining whether an input sensing takes place by contact of the operation object P.

On the other hand, in the information input device 100 of this embodiment, if the switches S1 of the Y-direction switch part 21 are respectively turned to the terminals T1 connected to the signal transmission lines, the number of detection signals are transmitted to the timing switch part 23. As a result, the detection signals are sequentially supplied from the timing switch part 23 to the input control unit 110. Specifically, in the case of FIG. 4, the detection signals supplied to the switches S1 (1)-(6) of the Y-direction switch part 21 are supplied to the timing switch part 23. The signal transmission lines may be used when selecting a sensor group including the sensors having sensed contact of the operation object P. Namely, when selecting a sensor group, the signal transmission lines, different from the signal transmission lines used at the time of determining the input sensing of the operation object P, are used.

The X-direction switch part 22 is a switching circuit which switches ON/OFF of the signal transmission lines, including the signal lines to transmit the detection signals from the input sensing parts 172 (arrayed in the direction of X) to first-stage OR circuits OR1 and the signal lines to transmit the detection signals to second-stage OR circuits OR2. For this purpose, the X-direction switch part 22 includes a plurality of switches S2 (1)-(6) for switching ON/OFF of the above-mentioned signal transmission lines. Each switch S2 is controlled in accordance with a control signal from the input control unit 110 (which signal is an output signal from a terminal OUT1 of the input control unit 110). In the OR circuits OR1 to which the detection signals are supplied after ON/OFF of the above-mentioned signal transmission lines is switched, a corresponding number of signal lines for the number of input sensing parts 171 arrayed in the direction of X are wired (in the case of FIG. 4, two signal lines are wired).

In the information input device 100 of this embodiment, a corresponding number of the X-direction switch parts 22 for the number of input sensing parts 171 arrayed in the direction of Y are provided (in the case of FIG. 4, six X-direction switch parts 22), and the OR circuits OR1 (1)-(6) corresponding to the X-direction switch parts 22 are provided.

To the output ends of the OR circuits OR1 (1) and (2), the OR circuits OR2 (1) and (2) are connected respectively. The signal line to transmit the output signal from the OR circuit OR1 (1) or (2) and the signal line to transmit the output signal directly output from the input sensing part 171 that does not pass through the OR circuit OR1 are wired to the input ends of each of the OR circuits OR2 (1) and (2).

The signal lines from the OR circuits OR2 (1) and (2) and the signal lines from the OR circuits OR1 (3)-(6) are wired to the inputs of the subsequent-stage Y-direction switch part 21 respectively. Therefore, the output signals from the OR circuits OR2 (1) and (2) and the output signals from the OR circuits OR1 (3)-(6) are separately transmitted to the subsequent-stage Y-direction switch part 21.

For example, in the information input device 100 of this embodiment, if the switches S2 of the X-direction switch part 22 are respectively turned to the terminals T4 connected to the signal transmission lines, the number of detection signals from the six groups of the two ISPs 171 arrayed in the direction of X are transmitted to the first-stage OR circuits OR1 (1)-(6). As a result, the detection signals integrated on an X-direction group basis (or integrated detection signals per sensor group) are transmitted to the subsequent-stage OR circuits OR2 (1) and (2) or the Y-direction switch part 21. Specifically, in the case of FIG. 4, the detection signals of the input sensing part 171 (1-1) and the input sensing part 171 (2-1) input to the X-direction switch part 22 (1) are transmitted to the first-stage OR circuit OR1 (1), and an integrated detection signal is supplied from the first-stage OR circuit OR1 (1) through the second-stage OR circuit OR2 (1) to the Y-direction switch part 21. Namely, the OR of the two detection signals from the input sensing parts 171 arrayed in the direction of X is performed, and the resulting signal from the first-stage OR circuit OR1 (1) is transmitted to the second-stage OR circuits OR2 (1) and (2) or the Y-direction switch part 21. The signal transmission lines may be used when selecting a sensor group including the input sensing parts 171 having sensed contact of the operation object P.

On the other hand, if the switches S2 of the X-direction switch part 22 are respectively turned to the terminals T3 connected to the signal transmission lines, the number of detection signals from the six groups of the two ISPs 171 arrayed in the direction of X are transmitted to the second-stage OR circuits OR2. As a result, the detection signals integrated on an X-direction group basis are transmitted through the second OR circuits OR2 to the subsequent-stage Y-direction switch part 21. Specifically, in the case of FIG. 4, the detection signals of the input sensing parts 171 (1-1)-(1-6) input to the X-direction switch parts 22 (1)-(6) are transmitted to the second-stage OR circuit OR2 (1), and an integrated detection signal is supplied from the second-stage OR circuit OR2 (1) to the Y-direction switch part 21. The signal transmission lines may be used when specifying the sensors 1711 having sensed the operation object P from the sensor group. Namely, when specifying the sensors 1711, the signal transmission lines, different from the signal transmission lines used at the time of determining input sensing of the operation object P and at the time of selecting a sensor group including the sensors having sensed contact of the operation object P, are used.

In this manner, the information input device 100 of this embodiment is arranged so that the output signals from the input unit 170 (or the plurality of detection signals from the input sensing parts 171) to the input control unit 110 are integrated by using the two or more stages OR circuits in combination. Specifically, by using a selection circuit including a set of OR circuits arranged in a multilevel configuration, the plurality of detection signals output from the input sensing parts 171 are integrated into a single detection signal and the integrated detection signal is supplied to the control unit 110. Thereby, in the information input device 100 of this embodiment, the number of signal lines connected between the input unit 170 and the input control unit 110 can be reduced. Specifically, in the case of FIG. 4, the twelve signal lines from the input sensing parts 171 can be reduced to one signal line by using the switch part 172 including the selection circuit which integrates the plurality of detection signals into a single detection signal.

The timing switch part 23 is a switching circuit which switches the timing of outputting, to the input control unit 110, of the detection signals received when the switches S1 of the Y-direction switch part 21 are turned to the terminals T1 connected to the timing switch part 23 via the signal transmission lines.

For example, in the information input device 100 of this embodiment, a plurality of input detection signals are sequentially output in accordance with a clock. Specifically, when the clock is 'H', the plurality of input detection signals are sequentially output by the switches S1 (1) to (6) in this order. Alternatively, the plurality of input detection signals may be converted into a serial signal (or a serialized signal) and the serial signal may be output. Serial conversion of signals may be one of the known digital signal transmission techniques for converting a parallel signal into a serial signal.

The timing switch part 23 controls the outputting of the received detection signals in accordance with a control signal from the input control unit 110 (which signal is an output signal from a terminal OUT3 of the input control unit 110).

As described in the foregoing, the information input device 100 of this embodiment is arranged so that transmission of digital signals is controlled by the timing switch part 23 and the switching ON/OFF of the signal transmission lines is controlled by the Y-direction switch part 21 and the X-direction switch part 22. Thereby, the selection of the sensor group and the specifying of the sensors 1711 having sensed contact of the operation object P can be performed.

Figure 5:
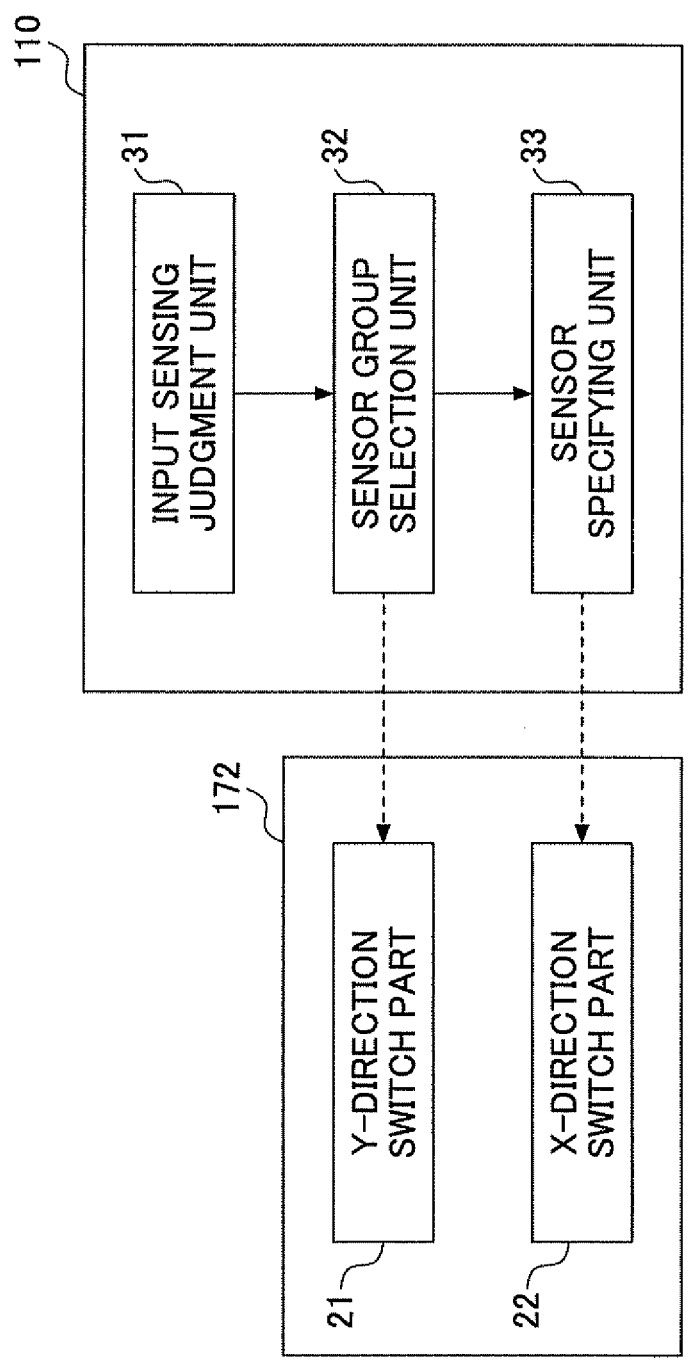
FIG. 5 is a diagram illustrating the functional composition of the information input device of the present embodiment.

Next, the input control function by the input control unit 110 will be described. FIG. 5 is a diagram illustrating the functional composition of the information input device 100 of this embodiment.

As illustrated in FIG. 5, in the information input device 100 of this embodiment, the input control unit 110 includes an input sensing judgment unit 31, a sensor group selection unit 32, and a sensor specifying unit 33.

The input sensing judgment unit 31 is a function part which determines whether an operation input is sensed based on an integrated detection signal of the plurality of detection signals output from the plurality of input sensing parts 171 received from the selection circuit provided in the switch part 172. The integrated detection signal is supplied to the terminal IN of the input control unit 110 through the signal transmission line connected to the terminals T2 when the switches S1 of the Y-direction switch part 21 provided in the switching part 172 are turned to the terminals T2.

When the received integrated detection signal is 'H', the input sensing judgment unit 31 determines that at least one of the plurality of input sensing parts 171 has detected contact of the operation object P with the operation surface in the neighborhood. In this manner, the input sensing judgment unit 31 determines whether contact of the operation object P with the operation surface (or input sensing from the operation object P) takes place. The character 'H' or of the integrated detection signal means the high-level or low-level output (or the logic level 1 or 0) of the OR circuit.

When it is determined that contact of the operation object P (or input sensing) takes place, the input sensing judgment unit 31 sets the input detection flag. For example, the input detection flag is changed from 'OFF (0)' to 'ON (1)'.

The sensor group selection unit 32 is a function part which selects a sensor group including the input sensing parts 171 having sensed the operation object P, from among the plurality of sensor groups arranged for the operation surface, based on the detection signals of the input sensing parts 171.

When the input sensing judgment unit 31 determines that contact of the operation object P (or input sensing) takes place, the sensor group selection unit 32 selects the sensor group including the input sensing parts 171 having sensed the operation object P. This sensor group is equivalent to the smallest unit of the operation area selectable from the whole display screen in the display unit 160. For example, in this embodiment, one row of the two input sensing parts 171 arrayed in the direction of X is assumed as being one sensor group. The smallest unit of the operation area may be a sensor group including a number of input sensing parts 171 arranged in a predetermined range of the operation surface. Therefore, the whole operation surface comprises the plurality of sensor groups.

The input control unit 110 causes the switches S1 of the Y-direction switch part 21 of the switching part 172 to be turned to the terminals T1 by outputting the control signal from the terminal OUT2 to the Y-direction switch part 21. As a result, the number of integrated detection signals on an X-direction group basis are sequentially supplied to the terminal IN of the input control unit 110 through the timing switch part 23. These detection signals are transmitted through the signal transmission lines connected to the terminals T1 of the switches S1 of the Y-direction switch part 21 and through the signal transmission lines connected to the terminals T4 of the switches S2 of the X-direction switch part 22. As a result, the integrated detection signal per sensor group (which signal will be referred to as "sensor-group detection signal") is input to the terminal IN of the input control unit 110 through the selection circuit of the switching part 172.

The switching part 172 includes a sensor group selection circuit which integrates the plurality of detection signals from the plurality of input sensing parts 171 into an integrated detection signal per sensor group. The switching part 172 operates in accordance with the switching ON of the signal transmission lines.

When the received sensor group detection signal is 'H', the sensor group selection unit 32 selects the corresponding group of the input sensing parts 171 arrayed in the direction of X as a sensor group. The sensor group selection unit 32 limits the input-permissible area of the whole operation surface to an X-direction basis operation area including the input sensing parts 171 having sensed the operation object P. The character 'H' or 'L' of the sensor group detection signal means the high-level or low-level output (or the logic level 1 or 0) of the OR circuit.

When a specific sensor group is selected, the sensor group selection unit 32 sets the corresponding one of the sensor group flags provided for the respective sensor groups. For example, the sensor group flag is changed from 'OFF (0)' to 'ON (1)'.

The sensor specifying unit 33 is a function part which specifies the input sensing parts 171 having detected the operation object P from the selected sensor group, based on the detection signals of the input sensing parts 171 contained in the sensor group selected by the sensor group selection unit 32.

In accordance with the ON state of the corresponding sensor group flag, the input control unit 110 outputs the control signal from the terminal OUT1 thereof and causes the corresponding one of the switches S2 of the X-direction switch part 22 of the switching part 172 to be turned to the terminal T3. At this time, when two or more sensor group flags are set to 'ON', the input control unit 110 performs the switching control of the corresponding switches S2 of the X-direction switch part 22 sequentially. During the switching control of a specific switch S2 of the X-direction switch part 22 according to the ON state of the sensor group flag, other switches 52 of the X-direction switch part 22 which are not controlled are set in the non-connection state in which these switches S2 are not connected to both the terminals T3 and the terminals T4.

As a result, the detection signals of the input sensing parts 171 are supplied through the timing switch part 23 to the terminal IN of the input control unit 110. The detection signals are transmitted through the signal transmission line connected to the terminal T1 of the switch S1 of the Y-direction switch part 21 and through the signal transmission line connected to the terminal T3 of the switch S2 of the X-direction switch part 22. Namely, the detection signals of the input sensing parts 171 of the sensor group selected by the sensor group selection unit 32 are sequentially input to the input control unit 110 in order of the array of the input sensing parts 171 in the direction of X.

When the received input detection signal is 'H', the sensor specifying unit 33 specifies the corresponding input sensing part 171 as the input sensing part 171 having sensed the operation object P. In other words, the sensor specifying unit 33 specifies the input sensing parts 171 having sensed the operation object P from the limited operation area. The character 'H' or 'L' of the detection signal means the high-level or low-level output (or the logic level 1 or 0) of the OR circuit.

When the input sensing part 171 is specified, the sensor specifying unit 33 sets the corresponding one of the sensor flags provided for the respective input sensing parts 171. For example, the sensor flag is changed from 'OFF (0)' to 'ON (1)'.

Next, the processing of the input control by the information input device of this embodiment will be described. For example, the input control processing is carried out by execution of an input control program (software component) (which is loaded from the ROM 120 to the RAM 130 in the information input device 100) by the input control unit 110.

In the following, an exemplary processing of the input control in a case in which the input sensing parts 171 located at the positions (1-1), (2-1) and (1-2) in the circuit diagram of FIG. 4 have detected the operation object P will be described.

Figure 6:
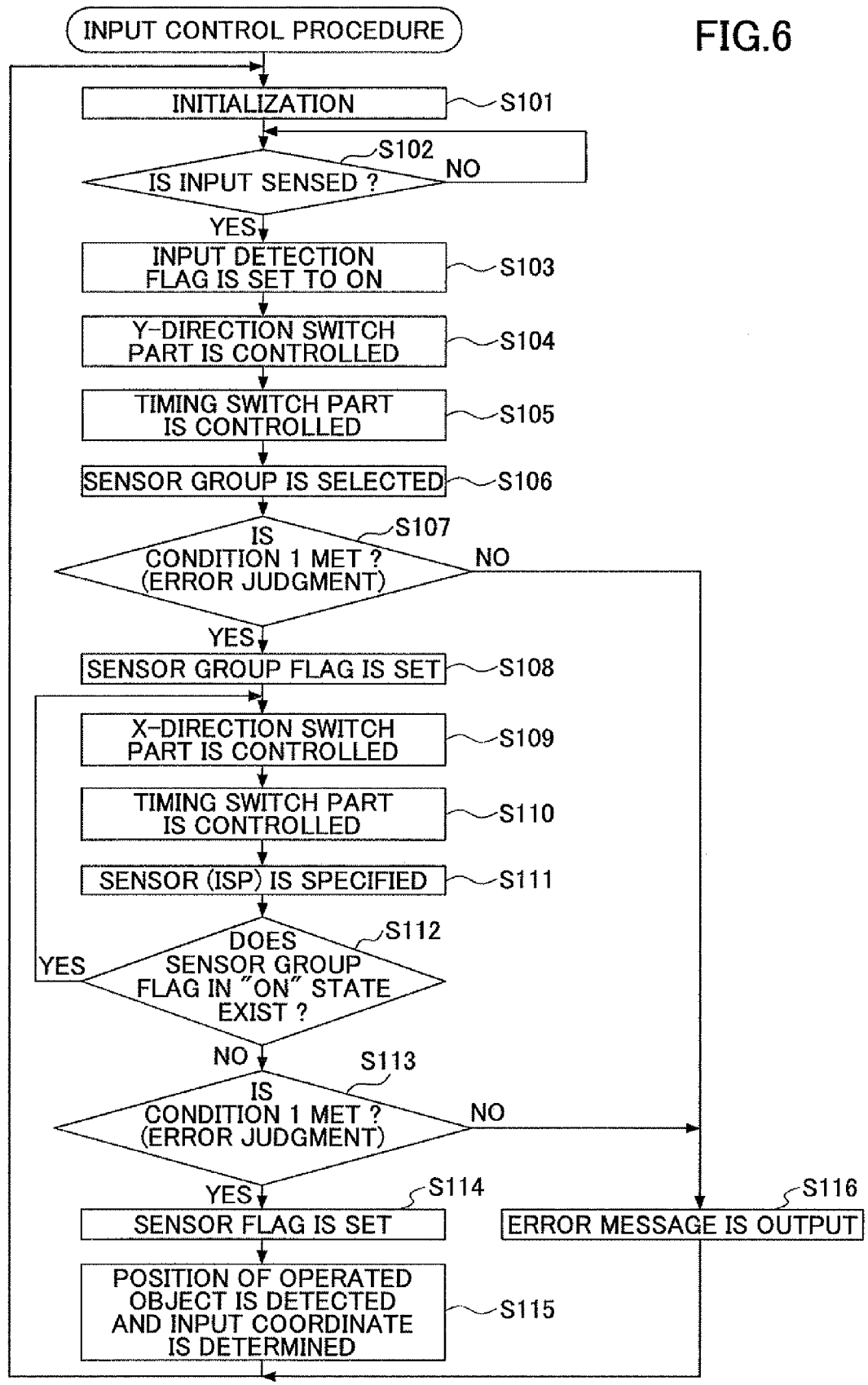
FIG. 6 is a flowchart for explaining the processing of input control performed by the information input device of the present embodiment.

FIG. 6 is a flowchart for explaining the processing of the input control which is performed by the input control unit of the information input device of the present embodiment.

As illustrated in FIG. 6, upon start of the input control processing, the input control unit 110 of the information input device 100 initializes the hardware and the software of the information input device 100 (step S101).

The input control unit 110 performs the initialization of the hardware as follows. Specifically, the input control unit 110 outputs predetermined control signals to the Y-direction switch part 21 and the X-direction switch part 22 from the terminal OUT2 and the terminal OUT1 respectively, so that the switches S1 and the switches S2 are set in the initial connection state as illustrated in FIG. 7.

Figure 7:
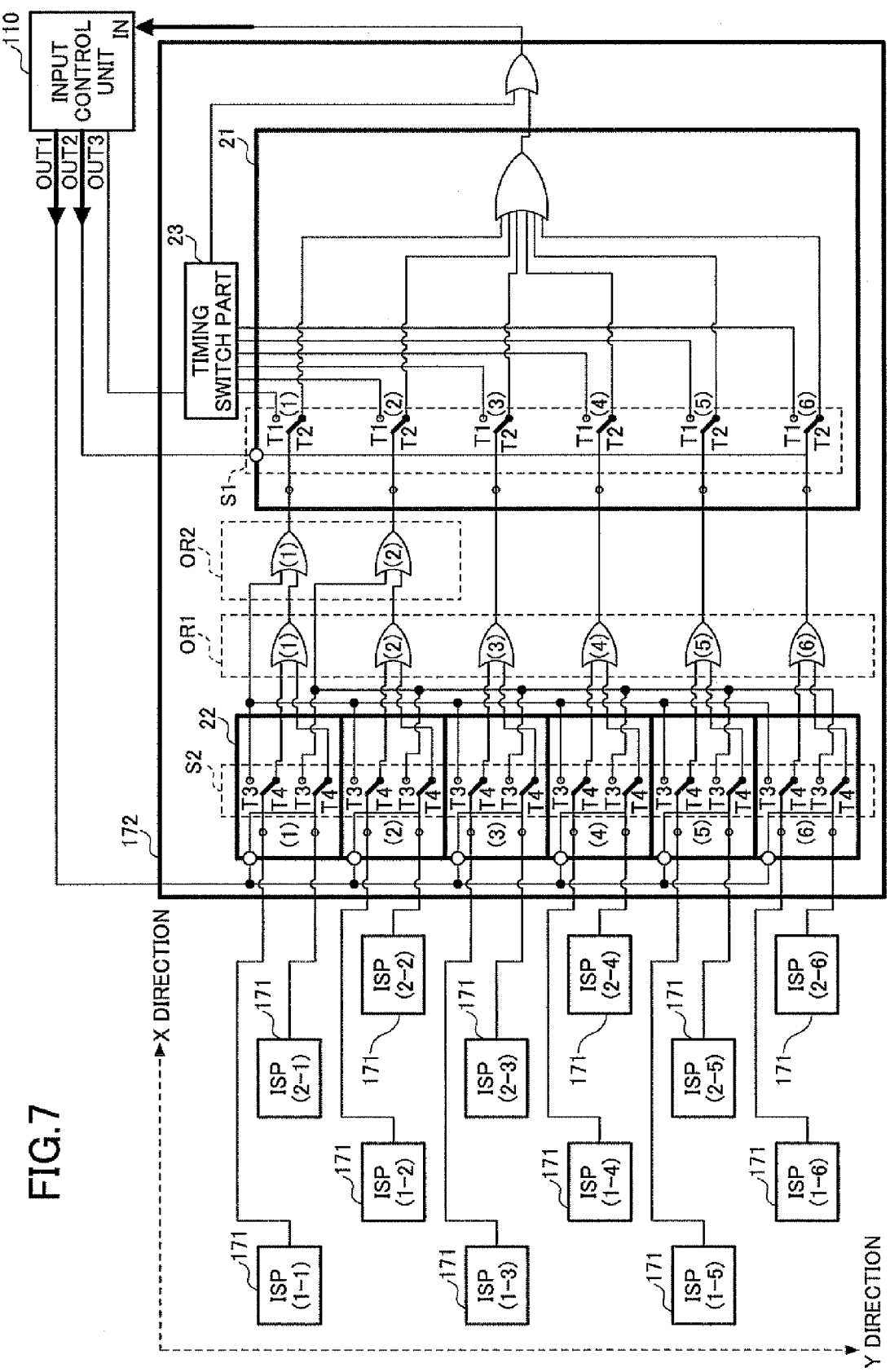
FIG. 7 is a diagram for explaining operation of the input unit of the present embodiment.

FIG. 7 is a diagram for explaining operation of the input unit 170 of this embodiment. As illustrated in FIG. 7, when the step S101 is performed, the switches S1 (1)-(6) of the Y-direction switch part 21 are turned to the terminals T2 and the switches S2 (1)-(6) of the X-direction switch part 22 are turned to the terminals T4 respectively.

As a result, an integrated detection signal is supplied to the terminal IN of the input control unit 110 from the signal transmission lines connected to the terminals T2 of the switches S1 of the Y-direction switch part 21 of the switching part 172.

The input control unit 110 performs the initialization of the software as follows. Specifically, the input control unit 110 sets various control flags including the input detection flag, the sensor group flags, and the sensor flags to the default values.

Subsequently, the input sensing judgment unit 31 of the input control unit 110 determines whether input sensing of the operation object P takes place, based on the detection signals from the input sensing parts 171 arranged in the predetermined position (step S102). Specifically, the input sensing judgment unit 31 of the input control unit 110 determines whether input sensing of the operation object P takes place, based on 'H' or 'L' of the integrated detection signal received at the terminal IN of the input control unit 110.

When the integrated detection signal is 'H', the input sensing judgment unit 31 determines that one of the input sensing parts 171 has determined contact of the operation object P, and it is determined in the step S102 that input sensing of the operation object P takes place.

On the other hand, when the integrated detection signal is 'L', the input sensing judgment unit 31 determines that any of the input sensing parts 171 has not detected contact of the operation object P, and it is determined in the step S102 that input sensing of the operation object P does not take place (step S102: NO). In this case, the input control unit 110 repeatedly performs the step S102 until the input of the operation object P is sensed.

When it is determined in the step S102 that input sensing of the operation object P takes place, the input sensing judgment unit 31 of the input control unit 110 sets the input detection flag to the ON state (step S103). Namely, the input detection flag set to the ON state by the input sensing judgment unit 31 indicates that the input of the operation object P has been detected. For example, the input detection flag is changed from 'OFF (0)' to 'ON (1)'.

Figure 8:
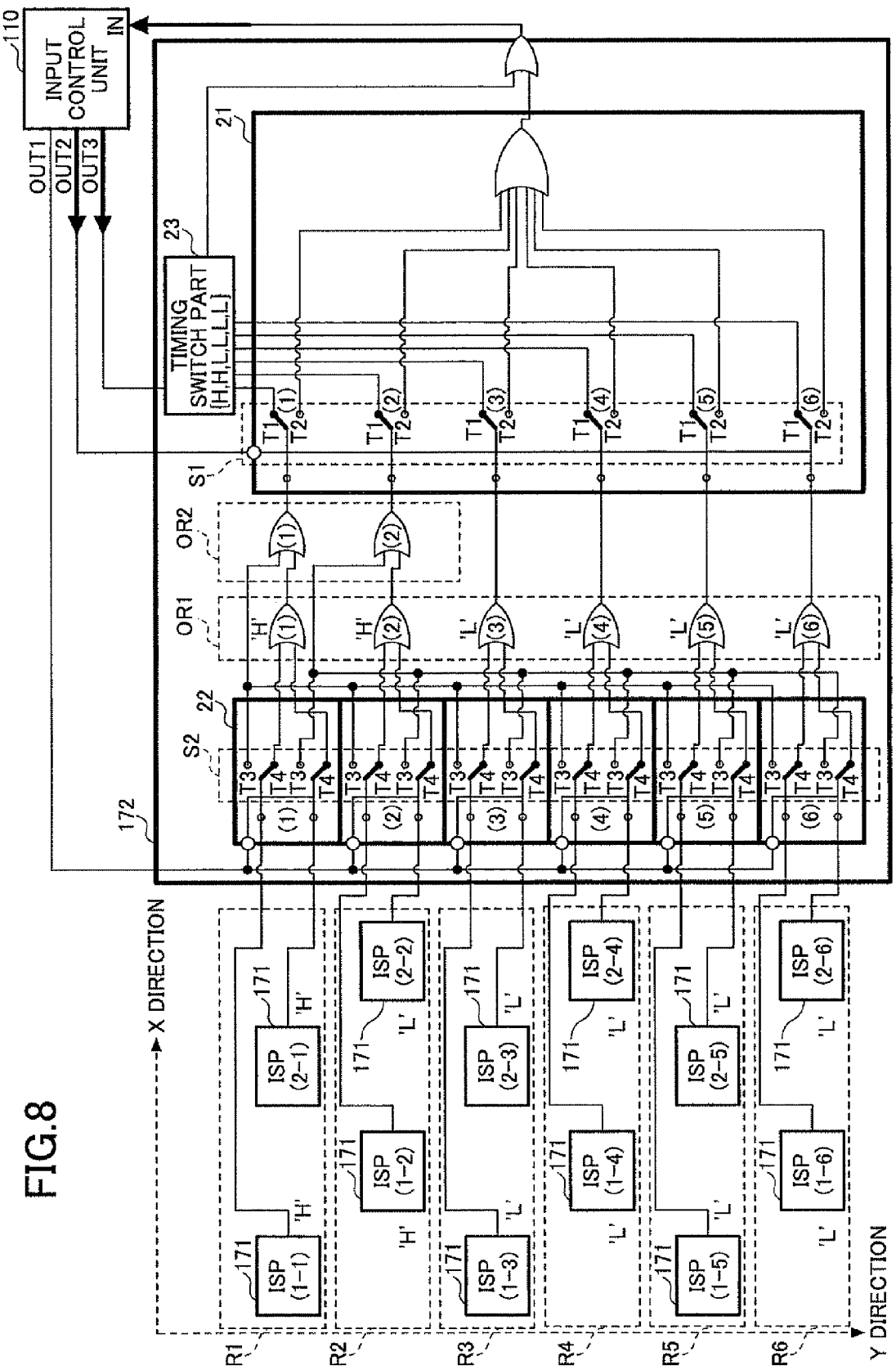
FIG. 8 is a diagram for explaining operation of the input unit of the present embodiment.

Subsequently, the input control unit 110 controls the switching of the switches S1 of the Y-direction switch part 21 of the switching part 172 (step S104). Specifically, the input control unit 110 outputs a predetermined control signal to the Y-direction switch part 21 from the terminal OUT2, so that the switches S1 are in the active connection state as illustrated in FIG. 8. Namely, the input control unit 110 instructs the switching ON of the Y-direction switch part 21.

FIG. 8 is a diagram for explaining operation of the input unit 170 of this embodiment. As illustrated in FIG. 8, when the step S104 is performed, the switches S1 (1)-(6) of the Y-direction switch part 21 are turned from the terminals T2 to the terminals T1.

Subsequently, the input control unit 110 controls the signal output timing of the timing switch part 23 of the switching part 172 (step S105). Specifically, the input control unit 110 outputs a predetermined control signal to the timing switch part 23 from the terminal OUT3 and controls the mode of the transmission of the digital signal input to the IN terminal. Namely, the input control unit 110 instructs the transmission mode, such as a sequential signal outputting mode or a serial signal outputting mode.

As a result, two or more sensor group detection signals, transmitted through the signal transmission lines connected to the terminals T1 of the switches S1 of the X-direction switch part 21 and through the signal transmission lines connected to the terminals T4 of the switches S2 terminal of the X-direction switch part 22, are supplied to the terminal IN of the input control unit 110 through the timing switch part 23.

Subsequently, the sensor group selection unit 32 of the input control unit 110 selects the sensor group including the input sensing parts 171 having sensed the operation object P from the plurality of sensor groups arrayed in the operation surface, in accordance with the received sensor group detection signal (step S106). Specifically, when the received sensor group detection signal is 'H', the input control unit 110 causes the sensor group selection unit 32 to select the corresponding group of the input sensing parts 171 arrayed in the direction of X as the sensor group. In the example of FIG. 8, the six rows of two input sensing parts 171, each connected to one X-direction switch part 22, correspond to the six sensor groups R1-R6 and one of these sensor groups is equivalent to the smallest unit of the operation area that is selectable from the whole display screen in the display unit 160.

In the example of FIG. 8, it is assumed that the input sensing parts 171 located at the positions (1-1), (2-1) and (1-2) have detected the operation object P. In this case, six sensor group detection signals 'H', 'H', 'L', 'L', 'L' and 'L' are supplied to the input control unit 110 through the timing switch part 23 in accordance with the instructed signal transmission mode.

In the above-mentioned case, the first and second sensor group detection signals are 'H' and the third to sixth sensor group detection signals are 'L'. Accordingly, the input control unit 110 causes the sensor group selection unit 32 to select the sensor group R1 including the two input sensing parts 171 located at the positions (1-1) and (2-1). Moreover, the input control unit 110 causes the sensor group selection unit 32 to select the sensor group R2 including the two input sensing parts 171 located at the positions (1-2) and (2-2). Namely, the sensor group selection unit 32 limits the input-permissible area of the whole operation surface to the operation area (sensor group) including the input sensing parts 171 having sensed the operation object P.

Subsequently, the input control unit 110 performs an error judgment process with respect to the selection of the sensor group Rn (step S107). Specifically, the input control unit 110 determines whether the selected sensor group Rn meets the following condition 1.

Condition 1: the sensors of the selected sensor group Rn constitute one input line or two adjacent input lines.

When the result of the determination at the step S107 is negative, it is assumed that the selected sensor group Rn meets the following condition 2.

Condition 2: the sensors of the selected sensor group Rn constitute two or more input lines that are not adjacent to each other.

The determination at the step S107 may be made based on the number of the received sensor group detection signals. For example, when three consequent 'H' bits are contained in the number of the received sensor group detection signals, it is determined that the above condition 2 is met.

When it is determined in the step S107 that the ISPs 171 of the selected sensor group Rn constitute two or more input lines which are not adjacent to each other, the input control unit 110 outputs an error message to the display unit 160 (step S116). When the above condition 2 is met, it is determined that an erroneous input operation has been performed by the user, such as the case in which two or more surface areas of the operation surface are simultaneously touched, or the case in which a too wide area of the operation surface is touched. In order to notify the user of an input error, the input control unit 110 outputs an error message to the display unit 160. For example, the input control unit 110 displays, on the display screen of the display unit 160, the error message concerning the input error, containing the information to request the user to touch the operation surface at one point by the operation object P.

On the other hand, when it is determined in the step S107 that the ISPs 171 of the selected sensor group Rn constitute one or two adjacent input lines (the condition 1 is met), the sensor group selection unit 32 of the input control unit 110 sets the corresponding one of the sensor group flags for the selected sensor group Rn (step S108). For example, the sensor group flag is changed from 'OFF (0)' to 'ON (1)'. For example, the sensor group flags are represented by a string of bits the number of which is equal to the number of the sensor groups Rn that can be selected (in the case of FIG. 8, six bits). In the case of FIG. 8, the bit string for representing the sensor group flags is set to "110000".

Figure 9:
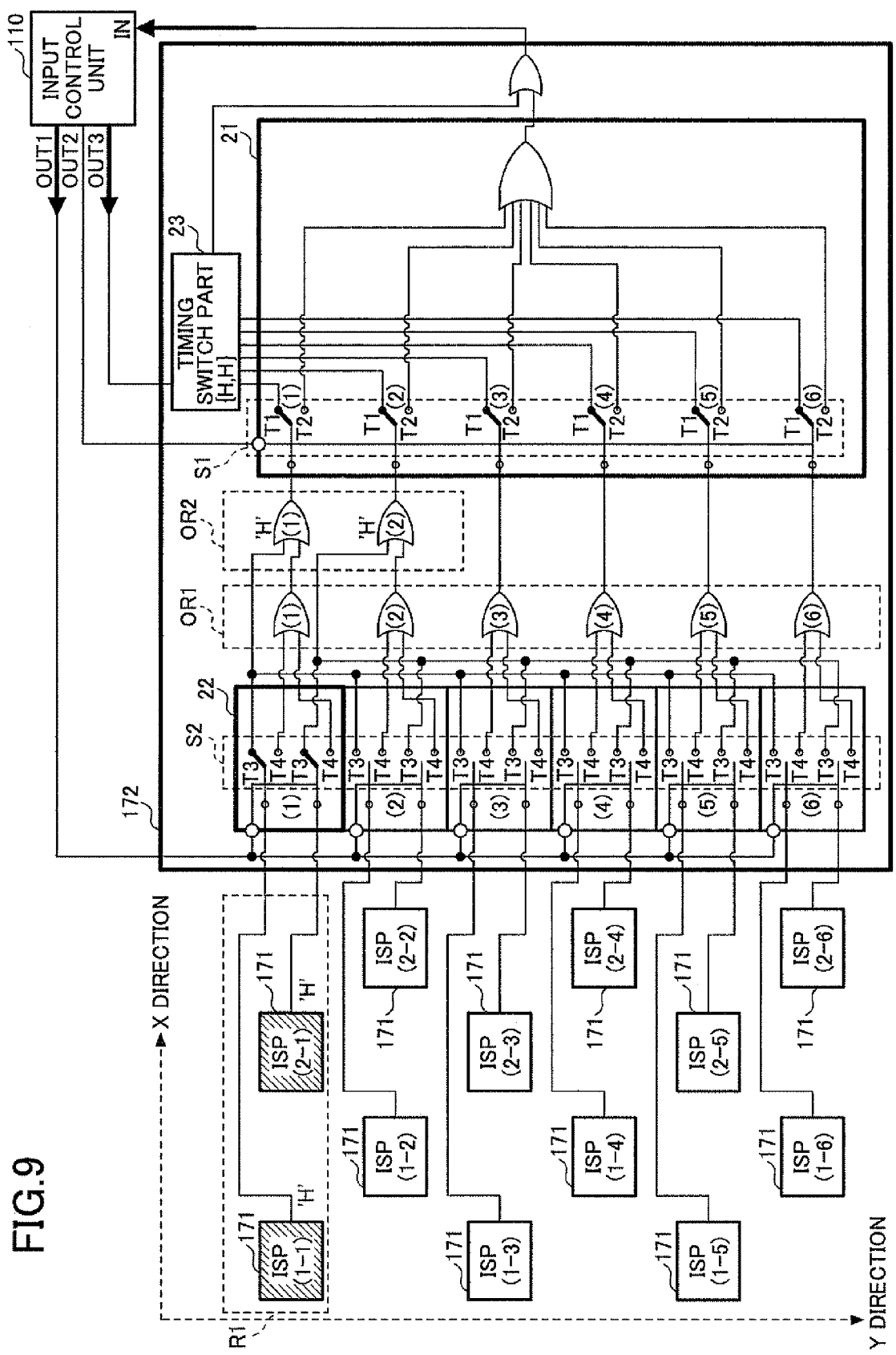
FIG. 9 is a diagram for explaining operation of the input unit of the present embodiment.

Subsequently, the input control unit 110 controls the switching of the switches S2 of the X-direction switch part 22 of the switching part 172 (step S109). Specifically, the input control unit 110 outputs a predetermined control signal to the X-direction switch part 22 from the terminal OUT1, so that the switches S2 are set in the active connection state as illustrated in FIG. 9. Namely, the input control unit 110 instructs the switching ON of the X-direction switch part 22.

The input control unit 110 controls the switching of the switches S2 in accordance with the sensor group flags set in the step S108. The input control unit 110 controls the switching of the corresponding switches S2 of the X-direction switch part 22 connected to the sensor groups Rn for which the sensor group flags are set to the ON state.

For example, when the bit string of the sensor group flags is "110000", the corresponding switch S2 (1) of the X-direction switch part 22 connected to the first sensor group R1 for which the sensor group flag is set to the ON state is turned to the terminal T3. During the switching control of a specific switch S2 of the X-direction switch part 22 according to the ON state of the sensor group flag, other switches S2 of the X-direction switch part 22 which are not controlled are set in the non-connection state in which these switches S2 are not connected to both the terminals T3 and the terminals T4.

FIG. 9 is a diagram for explaining operation of the input unit 170 of this embodiment. As illustrated in FIG. 9, when the step S109 is performed, the switches S2 (1) of the X-direction switch part 22 are turned from the terminals T4 to the terminals T3. At this time, the switching of the switches S2 (2)-(6) of the X-direction switch part 22 is not controlled, and these switches S2 are set in the non-connection state in which these switches S2 are not connected to both the terminals T3 and the terminals T4.

Subsequently, the input control unit 110 controls the signal output timing of the timing switch part 23 of the switching part 172 (step S110). This step S110 is the same as the step S105 described above, and a description thereof will be omitted.

As a result, the plurality of detection signals of the input sensing parts 171, transmitted through the signal transmission lines connected to the terminals T1 of the switches S1 of the Y-direction switch part 22 and through the signal transmission lines connected to the terminals T3 of the switches S2 of the X-direction switch part 22, are supplied to the terminal IN of the input control unit 110 through the timing switch part 23. Namely, the detection signals of the input sensing parts 171 included in the sensor group Rn (one or more input lines) selected by the sensor group selection unit 32 are input to the input control unit 110.

Subsequently, the sensor specifying unit 33 of the input control unit 110 specifies the input sensing parts 171 having sensed the operation object P from the selected sensor group Rn, based on the detection signals of the input sensing parts 171 contained in the selected sensor group Rn (step S111). Specifically, when the received detection signal of the input sensing part 171 is 'H', the sensor specifying unit 33 of the input control unit 110 specifies the corresponding input sensing part 171 located in the selected sensor group, as the input sensing part 171 having sensed the operation object P.

In the case of FIG. 9, when the step S109 and the step S110 are performed, the input control unit 110 causes the switches S2 (1) of the X-direction switching part 22 connected to the input sensing parts 171 located at the positions (1-1) and (2-1) to be turned to the terminals T3. Moreover, the input control unit 110 causes other switches S2 (2)-(6) of the X-direction switching parts 22 to be set in the non-connection state in which the switches are not connected to both the terminals T3 and the terminals T4.

In the above case, the two detection signals 'H' and 'H' of the input sensing parts 171 included in the selected sensor group R are supplied to the input control unit 110 through the timing switch part 23 in accordance with the instructed signal transmission mode.

When the first and second detection signals received at the input control unit 110 are 'H', the sensor specifying unit 33 specifies the two input sensing parts 171 located at the positions (1-1) and (2-1) (as indicated by the shaded blocks in FIG. 9) as the input sensing parts 171 having sensed the operation object P.

Subsequently, the input control unit 110 checks a following one of the sensor group flags (step S112). Specifically, the input control unit 110 determines whether the following one of the sensor group flags in the bit string is set in the 'ON' state.

Figure 10:
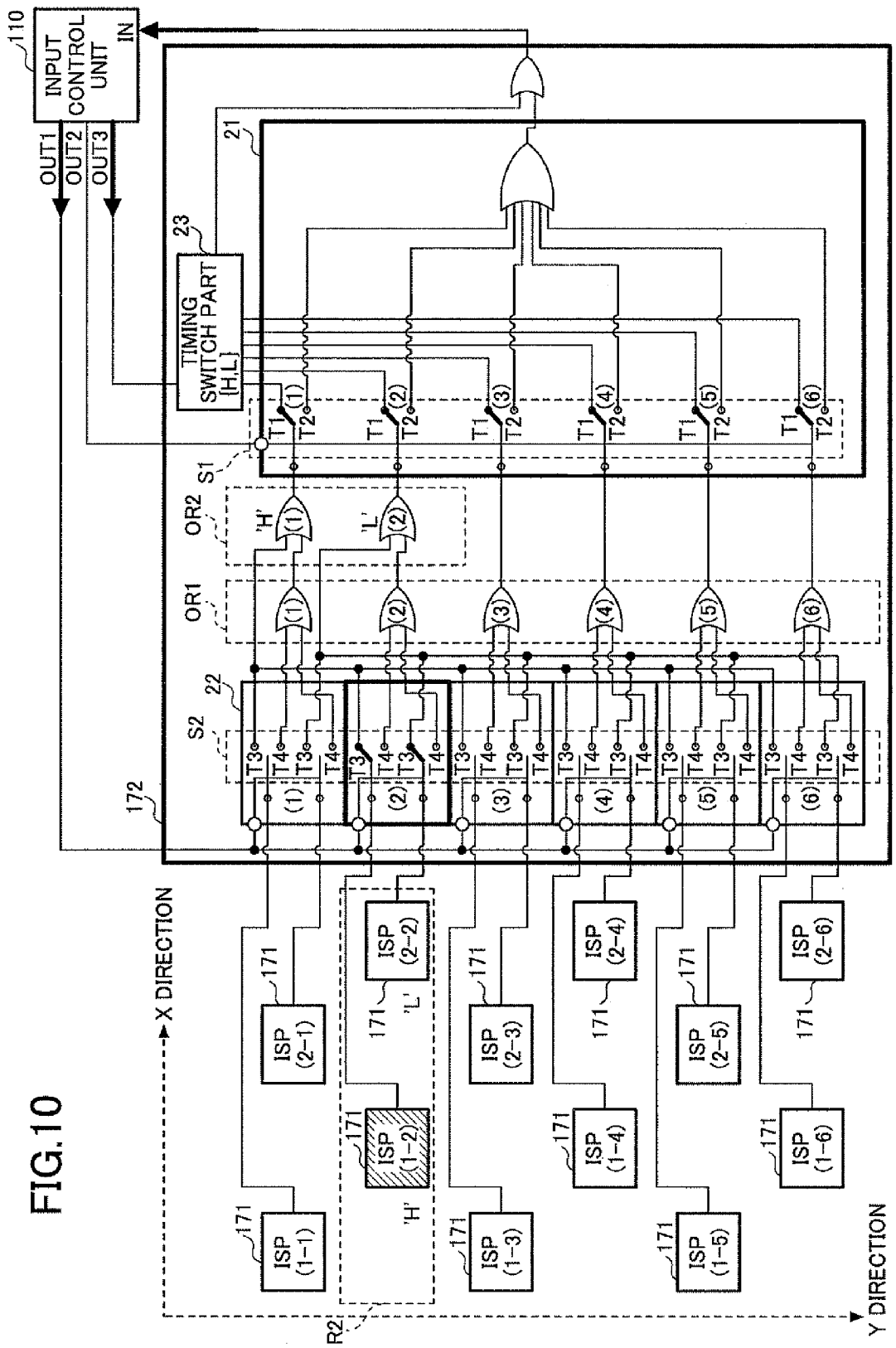
FIG. 10 is a diagram for explaining operation of the input unit of the present embodiment.

When it is determined in the step S112 that the following sensor group flag in the bit string is set in the 'ON' state, the input control unit 110 outputs a predetermined control signal to the X-direction switch part 22 from the terminal OUT1, so that the switches S2 are set in the active connection state as illustrated in FIG. 10.

At this time, the input control unit 110 controls the switching of the switches S2 in accordance with the sensor group flags set in the step S112. For example, when the bit string of the sensor group flags is "110000", the switches S2 of the X-direction switch part 22 connected to the sensor group R2 corresponding to the second bit of the bit string are turned ON to the terminals T3.

FIG. 10 is a diagram for explaining operation of the input unit 170 of this embodiment. As illustrated in FIG. 10, when the step S109 is performed, the switches S2 (2) of the X-direction switch part 22 are turned from the terminals T4 to the terminals T3. At this time, the switching of the switches S2 (1) and (3)-(6) of the X-direction switch part 22 is not controlled and these switches are in the state in which these switches S2 are not connected to both the terminals T3 and the terminals T4.

Subsequently, the input control unit 110 performs the above steps S109 to S112, and causes the sensor specifying unit 33 to specify the input sensing parts 171 having sensed the operation object P from the selected sensor group R2.

In the case of FIG. 10, the processing is performed as follows. As illustrated in FIG. 10, when the above steps S109 and S110 are performed, the input control unit 110 causes the switches S2 (2) of the X-direction switching part 22 connected to the input sensing parts 171 located at the positions (1-2) and (2-2) to be turned to the terminals T3. At this time, the input control unit 110 sets other switches S2 (1) and (3)-(6) of the X-direction switching parts 22 in the non-connection state in which these switches are not connected to both the terminals T3 and the terminals T4. As a result, the timing switch part 23 (which operates in accordance with the predetermined signal transmission mode) supplies, to the input control unit 110, two detection signals ('H', 'L') of the input sensing parts 171 contained in the selected sensor group R2 and arrayed in the X direction.

When the first and second detection signals received at the input control unit 110 are 'H' and 'L' respectively, the sensor specifying unit 33 specifies only the input sensing part 171 located at the position (1-2) (as indicated by the shaded block in FIG. 10) as the input sensing part 171 having sensed the operation object P.

In this manner, the input control unit 110 repeatedly performs the above steps S109 to S112 to control the switching of the X-direction switch part 22 each time the following one of the plurality of sensor group flags is set in 'ON' state. Thereby, the input control unit 110 specifies the input sensing parts 171 having sensed the operation object P for every selected sensor group Rn.

Subsequently, when it is determined in the step S112 that the remainder of the plurality of sensor group flags is not set in 'ON' state, the input control unit 110 performs an error judgment with respect to the specified input sensing parts 171 (step S113). Specifically, the input control unit 110 determines whether the input sensing parts 171 specified for every sensor group Rn meet the following condition 1.

Condition 1: the specified sensors (ISPs 171) constitute one input line or two adjacent input lines.

When the result of the determination at the step S113 is negative, it is assumed that the specified input sensing parts 171 meet the following condition 2.

Condition 2: the specified sensors (ISPs 171) constitute two or more input lines that are not adjacent to each other.

The determination at the step S113 may be made based on the respective detection signals of the input sensing parts 171 arrayed in the direction of X. For example, when three consequent 'H' bits are contained in the received detection signals, it is determined that the above condition 2 is met.

When it is determined in the step S113 that the specified input sensing parts 171 constitute two or more input lines which are not adjacent to each other, the input control unit 110 outputs an error message to the display unit 160 (step S116).

On the other hand, when it is determined in the step 113 that the specified input sensing parts 171 constitute one input line or two adjacent input lines, the input control unit 110 sets the corresponding one of the sensor flags for the specified input sensing parts 171 by the sensor specifying unit 33 (step S114). For example, the sensor flag is changed from 'OFF (0)' to 'ON (1)'. For example, the sensor flags are represented a string of bits the number of which is equal to the number of input sensing parts 171 arranged for the whole operation surface (in the case of in FIG. 10, 12 bits). Therefore, in the case of FIG. 10, the bit string of the sensor flags is set to "111000000000".

As a result, the input control unit 110 detects a position of the operation object P on the operation surface based on the detection signals of the specified input sensing parts 171, so that an input coordinate is determined (step S115).

Figure 11:
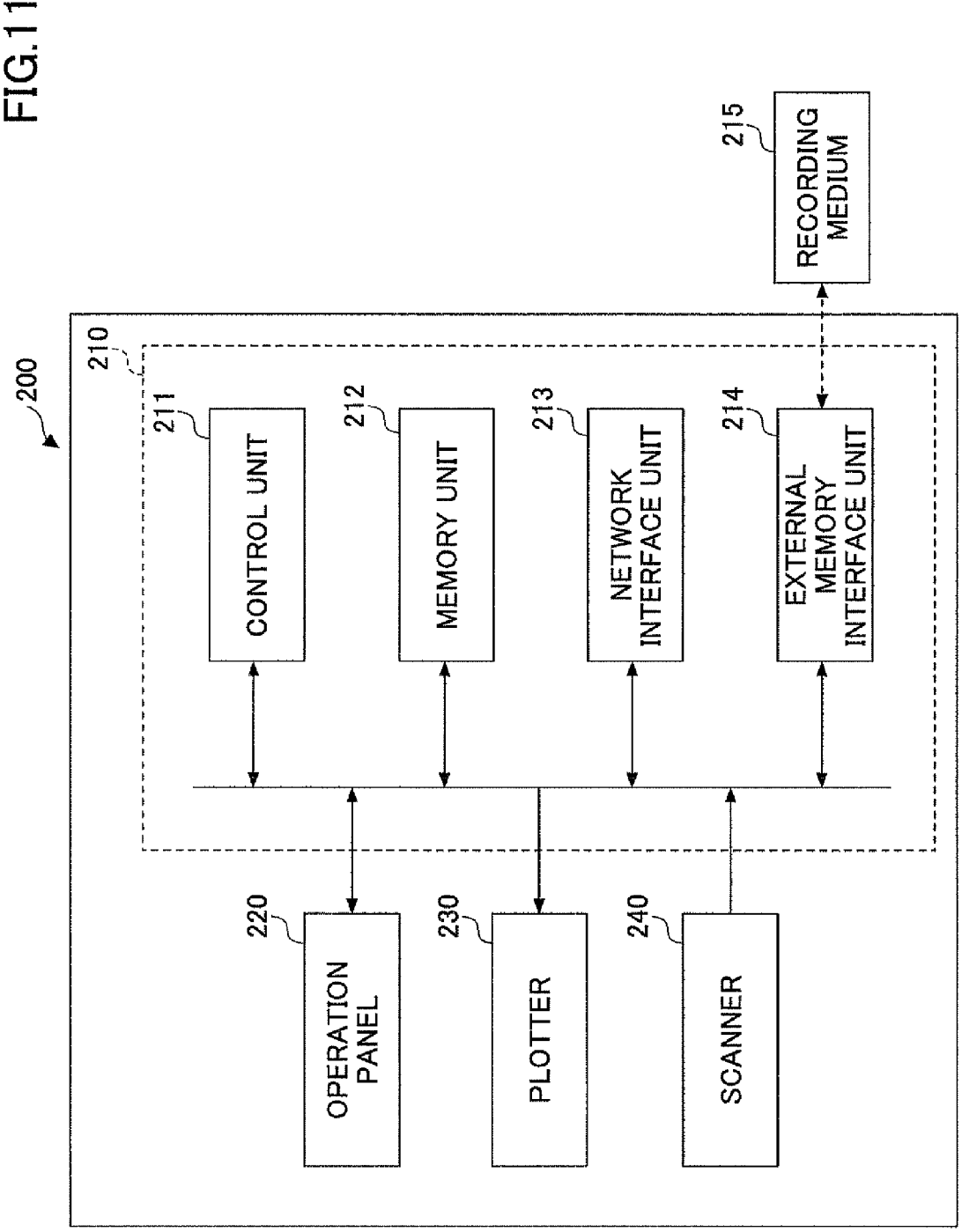
FIG. 11 is a diagram illustrating the hardware composition of an image forming device of an embodiment of the invention.

Next, FIG. 11 is a diagram illustrating the hardware composition of an image forming device 200 of an embodiment of the invention. As illustrated in FIG. 11, the hardware composition of the image forming device 200 includes a controller 210, an operation panel 220, a plotter 230, and a scanner 240. These elements are interconnected by a bus.

The operation panel 220 includes a display unit and an input unit. The operation panel 220 provides a user with a variety of kinds of information, such as device information, and receives a variety of kinds of user's operation, such as an operation setting and an operation command.

The plotter 230 includes an image formation unit to form an output image on a recording sheet in accordance with the information input from the operation panel 220. For example, the plotter 230 may use an electrophotographic printing process, an inkjet printing process, etc. in order to form an output image.

The scanner 240 includes a document reading unit to read an image from an original document. The scanner 240 generates the read image of the document and outputs the image to the controller 210.

The controller 210 includes a control unit 211, a memory device 212, a network interface unit 213, an external memory interface unit 214, etc. These components are interconnected by a bus.

The control unit 211 is a CPU to control operation and various functions of the entire image forming device 200 by executing programs. The memory device 212 stores and holds the above programs and various kinds of data (for example, image data). Examples of the memory device 212 may include a ROM (nonvolatile memory), a RAM (volatile memory), a HDD (hard disk drive) with a mass storage area, etc. The RAM provides a work area of the control unit 211 (in which the programs and the data are read and temporarily stored). The ROM and the HDD may be used as a storage medium of programs or various data.

In the image forming device 200, the control unit 211 reads out the program from the ROM and stores the program in the RAM, so that the program is executed on the RAM.

The network interface unit 213 is an interface circuit to connect the image forming device 200 with a predetermined data transmission line or a network. The external memory interface unit 214 is an interface unit in which a recording medium 215 which is an external memory is inserted. Examples of the external memory may include an SD (secure digital) memory card, a USB (universal serial bus) memory, etc. The image forming device 200 may read out the program and data from the recording medium 215 through the external memory interface unit 214.

By using the hardware composition described above, the image forming device 200 carries out an image formation function that converts print data into a raster image (bitmap image) by the controller 210 and forms a toner image on a recording sheet by the plotter 230.

The information input device 100 of this embodiment may be arranged in the image forming device 200 as the operation panel 220.

FIG. 12 is a diagram illustrating the hardware composition of the image forming device 200 of the present embodiment which is provided with the information input device 100. As illustrated in FIG. 12, the information input device 100 includes a communication interface unit 180 for performing data communication between the information input device 100 and the image forming device 200. The communication interface unit 180 is connected to the input control unit 110.

Similarly, the image forming device 200 includes an operation-panel communication interface unit 250 for performing data communication between the image forming device 200 and the information input devices 100. The operation-panel communication interface unit 250 is connected to the controller 210.

Accordingly, the image forming device 200 receives the information (for example, a control signal to instruct an image-formation-related function") input from the information input device 100 which is arranged in the image forming device 200 as the operation panel 220. The controller 210 of the image forming device 200 controls operation of the image-formation-related function based on the received information.

In the information input device 100 of the above-mentioned embodiment, the processing of selection of the sensor group and specifying of the sensors from the sensor group is realized by a predetermined program which, when executed by the processor (the input control unit 110 or a CPU), causes the processor to carry out the input control function. The program may be stored in a computer-readable recording medium 150. Examples of the recording medium 150 may include an SD memory card, a USB memory, etc. If the recording medium 150 is inserted in the external memory interface unit 140, the program may be installed in the information input device 100 through the external memory interface unit 140. Alternatively, if the information input device 100 is connected to an external device including the network interface unit 213, such as the image forming device 200 in FIG. 11, the program may be downloaded and installed in the information input device 100 by using the communication unit.

Although the processing of selection of the sensor group and specifying of the sensors from the sensor group in the above-mentioned embodiment is realized by a predetermined program which, when executed by the processor (the input control unit 110), causes the processor to carry out the input control function, the present disclosure is not this limitation. Alternatively, the hardware may be used instead to carry out the processing of selection of the sensor group and specifying of the sensors from the sensor group.

Although the plurality of input sensing part 171 in the above-described embodiment are arranged in a staggered configuration so that three neighboring input sensing parts 171 are located at vertices of an equilateral triangle, the present disclosure is not this limitation. Alternatively, the plurality of input sensing parts 171 may be arranged in a lattice formation so that four neighboring input sensing parts 171 are located at vertices of an equilateral rectangle. In the alternative case, the position of the operation object P on the operation surface may be detected based on the detection signals received from the four input sensing parts 171.

As described in the foregoing, according to the present disclosure, the sensors having detected the operated object are specified step by step from the sensor groups based on the integrated detection signals, and a position of the operation object is detected based on the detection signals of the specified sensors. Therefore, it is possible to provide an information input device, an image forming device, an input control method, and a computer-readable recording medium which are able to reduce the number of signal lines connected between the sensors and the control unit and effectively perform the input control.

The present invention is not limited to the specifically disclosed embodiments, and changes and modifications may be made without departing from the scope of the present invention.

The present application is based on Japanese patent application No. 2009-114813, filed on May 11, 2009, and Japanese patent application No. 2010-052383, filed on Mar. 9, 2010, the contents of which are incorporated herein by reference in their entirety.

What is claimed is:

1. An information input device, comprising:
   a plurality of sensors arranged for an operation surface at predetermined intervals, each sensor detecting contact of an operation object with the operation surface in a vicinity of the sensor and outputting a detection signal according to a distance between the sensor and the operation object;
   a control unit to control an input of the detection signal from the sensor;
   a switching unit to switch ON/OFF of signal lines to transmit the detection signals from the plurality of sensors to the control unit according to a predetermined control signal that is sent from the control unit;
   an input sensing judgment unit to determine whether an input of the operation object is sensed based on an integrated detection signal that is formed by integrating a plurality of detection signals output from the plurality of sensors;
   a sensor group selection unit to select a sensor group including sensors having sensed the operation object, from among the plurality of sensors arranged for the operation surface, based on detection signals of the sensors having sensed the operation object by sequentially switching ON/OFF of each of the signal lines one after the other by the switching unit;
   a sensor specifying unit to specify the sensors having sensed the operation object from the selected sensor group based on the detection signals of the sensors having sensed the operation object;
   a position detecting unit to detect a position of the operation object on the operation surface based on the detection signals of the sensors specified by the sensor specifying unit, and
   a plurality of OR circuits arranged in a multilevel configuration for integrating the plurality of detection signals output from the plurality of sensors into the integrated detection signal,
   wherein the plurality of OR circuits includes a first OR circuit and a second OR circuit located at a level subsequent to the first OR circuit in the multilevel configuration, the second OR circuit having input ends wired to the first OR circuit and further wired to a part of the sensors through a signal line to transmit the detection signal that is directly output from the part of the sensors, the signal line not passing through the first OR circuit.

2. The information input device according to claim 1, wherein, when it is determined by the input sensing judgment unit that an input of the operation object is sensed, the sensor group selection unit selects the sensor group including the sensors having sensed the operation object.

3. The information input device according to claim 1, wherein, when the sensor group is selected by the sensor group selection unit, the sensor specifying unit specifies the sensors having sensed the operation object.

4. The information input device according to claim 1, wherein the sensor group selection unit selects the sensor group including the sensors having sensed the operation object, based on the detection signals of the sensors which are supplied to the control unit through signal lines which are turned ON by the switching unit and different from signal lines having been turned ON at a time of determination of the input sensing by the input sensing judgment unit.

5. The information input device according to claim 4, wherein the sensor group selection unit selects the sensor group including the sensors having sensed the operation object, based on each of a plurality of sensor group detection signals which are supplied from the plurality of sensors to the control unit through signal lines turned ON by the switching unit.

6. The information input device according to claim 4, wherein the sensor specifying unit specifies the sensors having sensed the operation object, based on the detection signals of the sensors which are supplied to the control unit through signal lines which are turned ON by the switching unit and different from signal lines having been turned ON at a time of determination of the input sensing by the input sensing judgment unit and at a time of selection of the sensor group by the sensor group selection unit.

7. The information input device according to claim 6, wherein the sensor specifying unit specifies the sensors having sensed the operation object, based on detection signals of sensors included in the sensor group selected by the sensor group selection unit.

8. The information input device according to claim 7, wherein, when two or more sensor groups are selected by the sensor group selection unit, the sensor specifying unit specifies, for each of the selected sensor groups, the sensors having sensed the operation object, based on detection signals of sensors included in each of the selected sensor group.

9. The information input device according to claim 8, wherein the switching unit switches ON, for each of the selected sensor groups, signal lines to transmit detection signals of sensors included in each of the selected sensor group to the control unit, and the sensor specifying unit specifies the sensors having sensed the operation object, based on the detection signals which are supplied to the control unit through the signal lines turned ON by the switching unit for each of the selected sensor groups.

10. The information input device according to claim 4, further comprising an output unit to output a plurality of detection signals from the plurality of sensors to the control unit, wherein, when outputting the plurality of detection signals, the output unit sequentially outputs the plurality of detection signals to the control unit in accordance with a predetermined timing.

11. The information input device according to claim 4, further comprising an output unit to output a plurality of detection signals from the plurality of sensors to the control unit, wherein, when outputting the plurality of detection signals, the output unit converts the plurality of detection signals into a serial signal and outputs the serial signal to the control unit.

12. The information input device according to claim 1, further comprising an error judgment unit to determine an input error of the operation object, wherein, when the sensors included in the sensor group selected by the sensor group selection unit do not constitute one input line or two adjacent input lines, the error judgment unit determines the input of the operation object as being an error.

13. The information input device according to claim 1, further comprising an error judgment unit to determine an input error of the operation object, wherein, when the sensors included in the sensor group selected by the sensor group selection unit constitute two or more input lines that are not adjacent to each other, the error judgment unit determines the input of the operation object as being an error.

14. An image forming device including an image formation unit to form an image, wherein the image forming device comprises the information input device according to claim 1 and the image formation unit forms an image in accordance with information input by the information input device.

15. An input control method for use in an information input device including a plurality of sensors arranged for an operation surface at predetermined intervals, each sensor detecting contact of an operation object and outputting a detection signal according to a distance between the sensor and the operation object, the input control method comprising:
- controlling, by a control unit provided to the information input device, an input of the detection signal from the sensor;
- switching, by a switching unit provided to the information input device, ON/OFF of signal lines to transmit the detection signals from the plurality of sensors to the control unit according to a predetermined control signal that is sent from the control unit;
- determining, by an input sensing judgment unit, whether an input of the operation object is sensed based on an integrated detection signal of the plurality of detection signals that is formed by integrating a plurality of detecting signals output from the plurality of sensors;
- selecting, by a sensor group selection unit, a sensor group including sensors having sensed the operation object, from among the plurality of sensors arranged for the operation surface, based on detection signals of the sensors having sensed the operation object by sequentially switching ON/OFF of each of the signal lines one after the other by the switching unit;
- specifying, by a sensor specifying unit, the sensors having sensed the operation object from the selected sensor group based on the detection signals of the sensors having sensed the operation object;
- detecting, by a position detecting unit, a position of the operation object on the operation surface based on the detection signals of the sensors specified in the specifying, and
- integrating, by a plurality of OR circuits arranged in a multilevel configuration, the plurality of detection signals output from the plurality of sensors into the integrated detection signal,
- wherein the plurality of OR circuits includes a first OR circuit and a second OR circuit located at a level subsequent to the first OR circuit in the multilevel configuration, the second OR circuit having input ends wired to the first OR circuit and further wired to a part of the sensors through a signal line to transmit the detection signal that is directly output from the part of the sensors, the signal line not passing through the first OR circuit.

16. A non-transitory computer-readable recording medium storing a program which, when executed by a computer, causes the computer to perform an input control method for use in an information input device including a plurality of sensors arranged for an operation surface at predetermined intervals, each sensor detecting contact of an operation object and outputting a detection signal according to a distance between the sensor and the operation object, the input control method comprising:
- controlling, by a control unit provided to the information input device, an input of the detection signal from the sensor;
- switching, by a switching unit provided to the information input device, ON/OFF of signal lines to transmit the detection signals from the plurality of sensors to the control unit according to a predetermined control signal that is sent from the control unit;
- determining, by an input sensing judgment unit, whether an input of the operation object is sensed based on an integrated detection signal that is formed by integrating a plurality of detecting signals of the plurality of detection signals output from the plurality of sensors;
- selecting, by a sensor group selection unit, a sensor group including sensors having sensed the operation object, from among the plurality of sensors arranged for the operation surface, based on detection signals of the sensors having sensed the operation object by sequentially switching ON/OFF of each of the signal lines one after the other by the switching unit;
- specifying, by a sensor specifying unit, the sensors having sensed the operation object from the selected sensor group based on the detection signals of the sensors having sensed the operation object;
- detecting, by a position detecting unit, a position of the operation object on the operation surface based on the detection signals of the sensors specified in the specifying, and
- integrating, by a plurality of OR circuits arranged in a multilevel configuration, the plurality of detection signals output from the plurality of sensors into the integrated detection signal,
- wherein the plurality of OR circuits includes a first OR circuit and a second OR circuit located at a level subsequent to the first OR circuit in the multilevel configuration, the second OR circuit having input ends wired to the first OR circuit and further wired to a part of the sensors through a signal line to transmit the detection signal that is directly output from the part of the sensors, the signal line not passing through the first OR circuit.

* * * * *